US010558301B2

(12) United States Patent
Kaneda

(10) Patent No.: US 10,558,301 B2
(45) Date of Patent: *Feb. 11, 2020

(54) PROJECTION DISPLAY UNIT

(71) Applicant: SONY CORPORATION, Tokyo (JP)

(72) Inventor: Kazumasa Kaneda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/971,221

(22) Filed: May 4, 2018

(65) Prior Publication Data
US 2018/0253188 A1 Sep. 6, 2018

Related U.S. Application Data

(63) Continuation of application No. 15/502,917, filed as application No. PCT/JP2015/070910 on Jul. 23, 2015, now Pat. No. 10,013,116.

(30) Foreign Application Priority Data

Aug. 27, 2014 (JP) ................................. 2014-172425

(51) Int. Cl.
*G06F 3/042* (2006.01)
*G02B 13/00* (2006.01)
(Continued)

(52) U.S. Cl.
CPC ....... *G06F 3/0425* (2013.01); *G02B 13/0095* (2013.01); *G02B 13/16* (2013.01);
(Continued)

(58) Field of Classification Search
CPC ... G06F 3/0425; G02B 13/0095; G02B 13/16; G02B 27/283; G02B 27/288;
(Continued)

(56) References Cited

U.S. PATENT DOCUMENTS 7,593,026 B2 9/2009 Turner
7,917,020 B2 3/2011 Murata et al.
(Continued)

FOREIGN PATENT DOCUMENTS

EP 2179593 A1 4/2010
JP 09-080372 A 3/1997
(Continued)

OTHER PUBLICATIONS

Notice of Allowance and Fees Due for U.S. Appl. No. 15/502,917, dated Apr. 2, 2018, 2 pages.
(Continued)

*Primary Examiner* — Tom V Sheng
(74) *Attorney, Agent, or Firm* — Chip Law Group

(57) ABSTRACT

A projection display unit includes a projection optical system, a polarization separation device, and a detection optical system. The projection optical system includes an illuminator, a projection lens, and a light valve that modulates illumination light supplied from the illuminator, and outputs the modulated illumination light toward the projection lens. The polarization separation device separates entering light into a first polarized component and a second polarized component, and outputs the first polarized component and the second polarized component in respective directions that are different from each other. The detection optical system includes an imaging device and a reduction optical system. The imaging device receives, via the projection lens and the polarization separation device, light based on detection invisible light. A transmittance adjuster provided between the polarization separation device and the imaging device adjusts transmittance of at least part of a bundle of passing light rays derived from the invisible light.

18 Claims, 14 Drawing Sheets

(51) Int. Cl.
*G02B 13/16* (2006.01)
*G02B 27/28* (2006.01)
*G03B 21/20* (2006.01)
*H04N 9/31* (2006.01)

(52) U.S. Cl.
CPC ......... *G02B 27/283* (2013.01); *G03B 21/208* (2013.01); *H04N 9/3197* (2013.01)

(58) Field of Classification Search
CPC ............... G02B 27/141; G02B 27/149; G02B 27/1046; G02B 27/0905; G02B 27/0966; G03B 17/17; G03B 17/54; G03B 21/2073; G03B 21/208; H04N 9/3197; H04N 9/3167; H04N 9/3179; H04N 9/3194; H04N 9/31; H04N 9/3102; H04N 9/3141; H04N 13/0459; H04N 13/0443
See application file for complete search history.

(56) References Cited

U.S. PATENT DOCUMENTS

| | | | |
|---|---|---|---|
| 9,001,155 B2 | 4/2015 | Tamaru | |
| 9,454,067 B2* | 9/2016 | Yoon | G03B 21/142 |
| 10,013,116 B2* | 7/2018 | Kaneda | G02B 13/0095 |
| 10,244,217 B2* | 3/2019 | Kaneda | G03B 21/00 |
| 2001/0030779 A1* | 10/2001 | Ho | G02B 27/1026 359/20 |
| 2006/0072076 A1* | 4/2006 | Smoot | G03B 15/10 353/34 |
| 2006/0256140 A1 | 11/2006 | Turner | |
| 2006/0274274 A1* | 12/2006 | Adachi | G02B 27/1026 353/20 |
| 2006/0291840 A1 | 12/2006 | Murata et al. | |
| 2007/0216985 A1* | 9/2007 | Woodall | G02B 27/1026 359/237 |
| 2009/0225281 A1* | 9/2009 | Yu | G02B 27/102 353/81 |
| 2010/0201895 A1* | 8/2010 | Golub | A61B 5/0059 348/759 |
| 2011/0128503 A1* | 6/2011 | Sawai | G02B 27/26 353/8 |
| 2011/0310060 A1* | 12/2011 | Li | G03B 21/26 345/175 |
| 2013/0127980 A1 | 5/2013 | Haddick et al. | |
| 2013/0222237 A1* | 8/2013 | Jesme | G06F 3/0425 345/156 |
| 2013/0241955 A1 | 9/2013 | Tamaru | |
| 2013/0335301 A1 | 12/2013 | Wong et al. | |
| 2014/0176722 A1 | 6/2014 | Sashida | |
| 2014/0293231 A1* | 10/2014 | Yoon | G03B 21/142 353/20 |
| 2014/0293254 A1* | 10/2014 | Komatsuda | G03F 7/70108 355/67 |
| 2016/0196005 A1* | 7/2016 | Kaneda | G03B 11/00 348/744 |
| 2017/0208305 A1* | 7/2017 | Kaneda | G03B 21/00 |
| 2017/0228057 A1* | 8/2017 | Kaneda | G06F 3/042 |

FOREIGN PATENT DOCUMENTS

| | | |
|---|---|---|
| JP | 9-080372 A | 3/1997 |
| JP | 09-305312 A | 11/1997 |
| JP | 9-305312 A | 11/1997 |
| JP | 2003-044839 A | 2/2003 |
| JP | 4289326 B2 | 7/2009 |
| JP | 2010-538685 A | 12/2010 |
| JP | 2013-003859 A | 1/2013 |
| JP | 2013-073199 A | 4/2013 |
| JP | 2015-064550 A | 4/2015 |
| WO | 2009/010977 A1 | 1/2009 |
| WO | 2013/111376 A1 | 8/2013 |
| WO | 2014/141718 A1 | 9/2014 |
| WO | 2015/029365 A1 | 3/2015 |

OTHER PUBLICATIONS

Notice of Allowance and Fees Due for U.S. Appl. No. 15/502,917, dated Mar. 2, 2018, 9 pages.
International Search Report and Written Opinion of PCT Application No. PCT/JP2015/070910, dated Oct. 6, 2015, 9 pages of English Translation and 9 pages of ISRWO.
International Preliminary Report on Patentability of PCT Application No. PCT/JP2015/070910, dated Mar. 9, 2017, 10 pages of English Translation and 5 pages of IPRP.
Office Action for JP Patent Application No. 2016-545058, dated Jun. 11, 2019, 05 pages of Office Action and 05 pages of English Translation.
Office Action for JP Patent Application No. 2016-545058, dated Oct. 1, 2019, 6 pages of Office Action and 5 pages of English Translation.

* cited by examiner

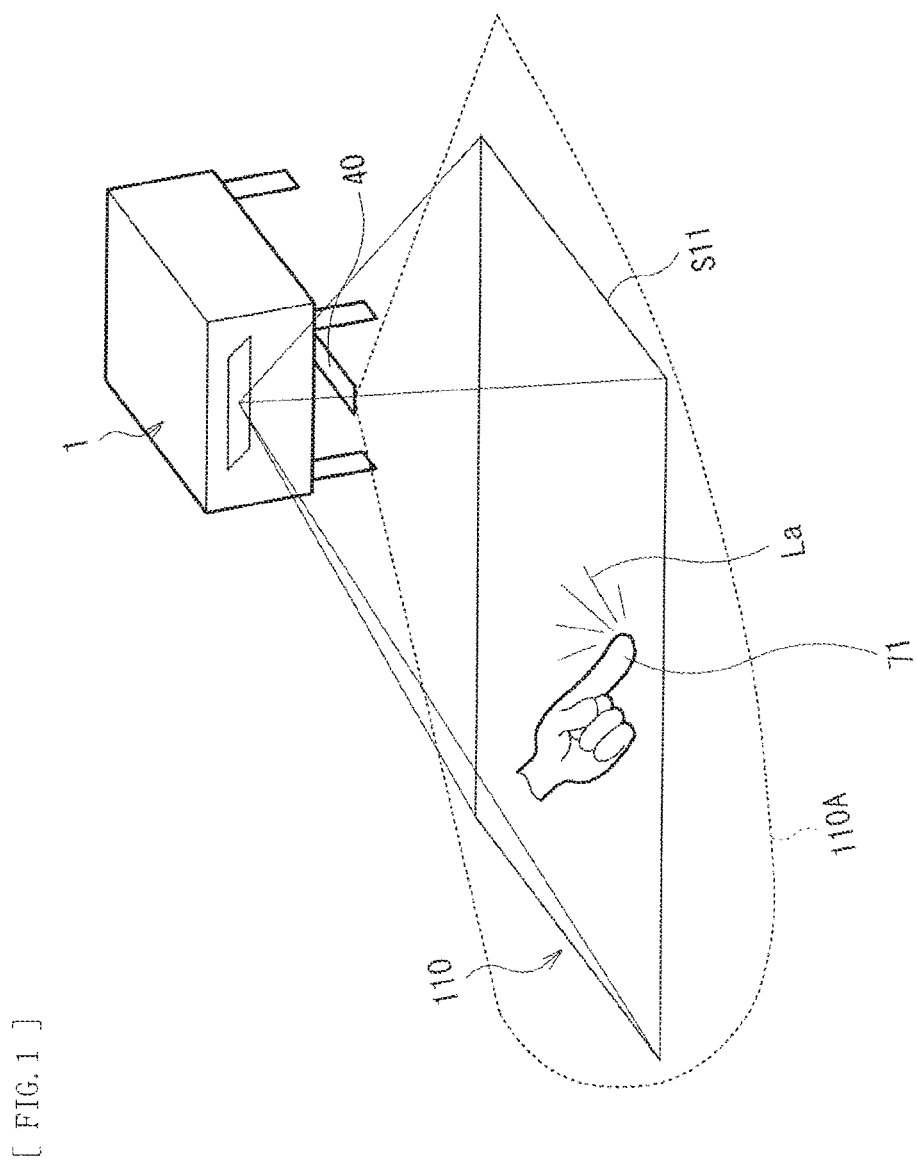
[ FIG. 1 ]

[FIG. 2]
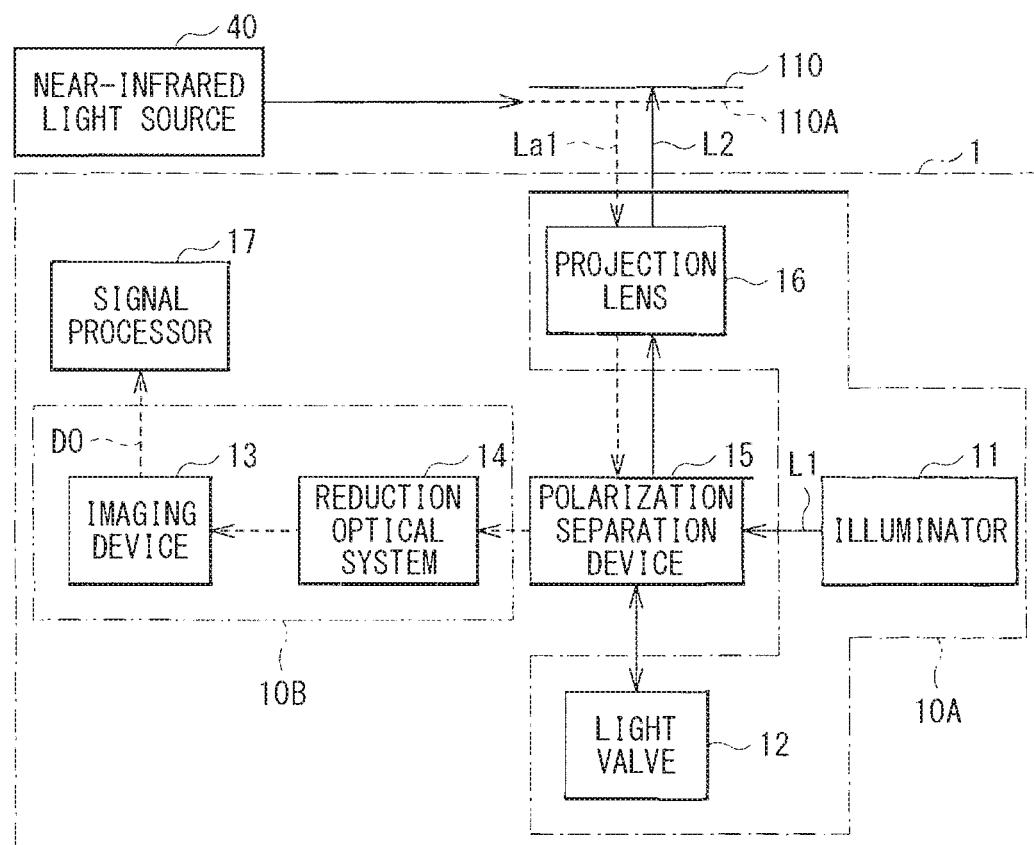

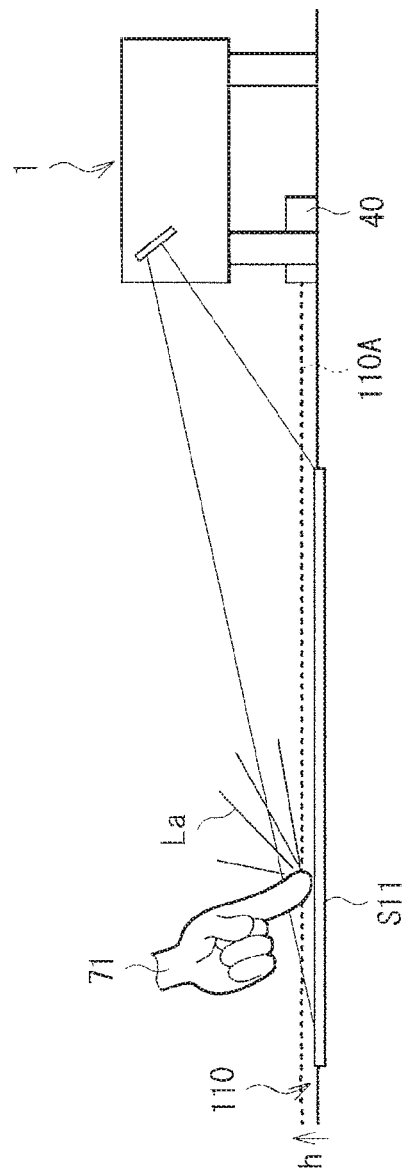

[ FIG. 4 ]
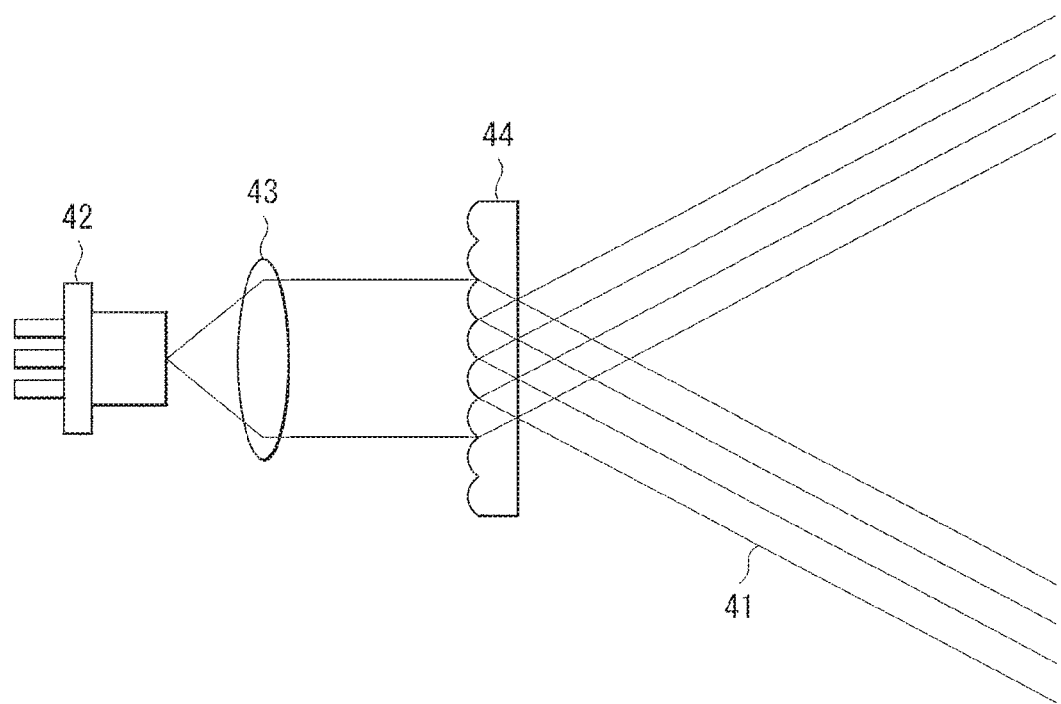
[ FIG. 5A ]
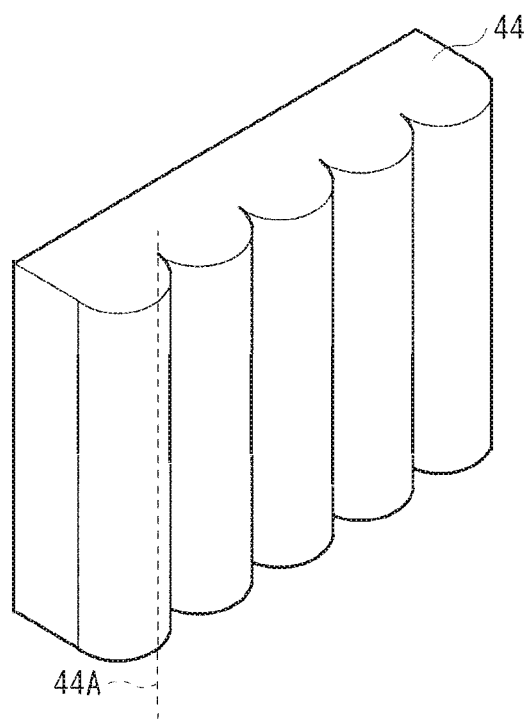

[ FIG. 5B ]
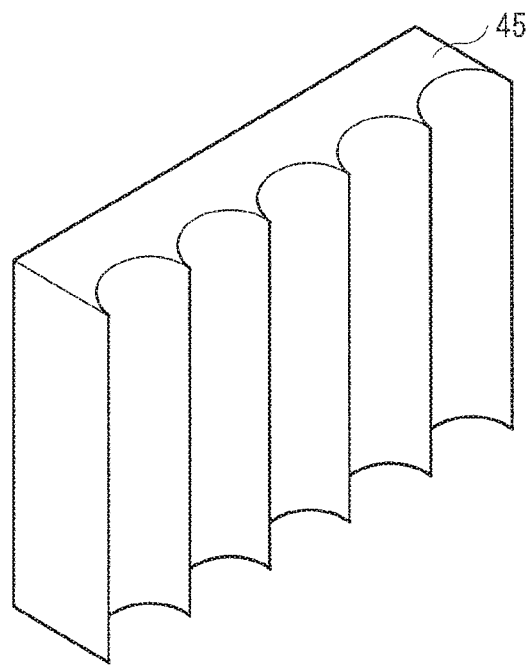
[ FIG. 6 ]
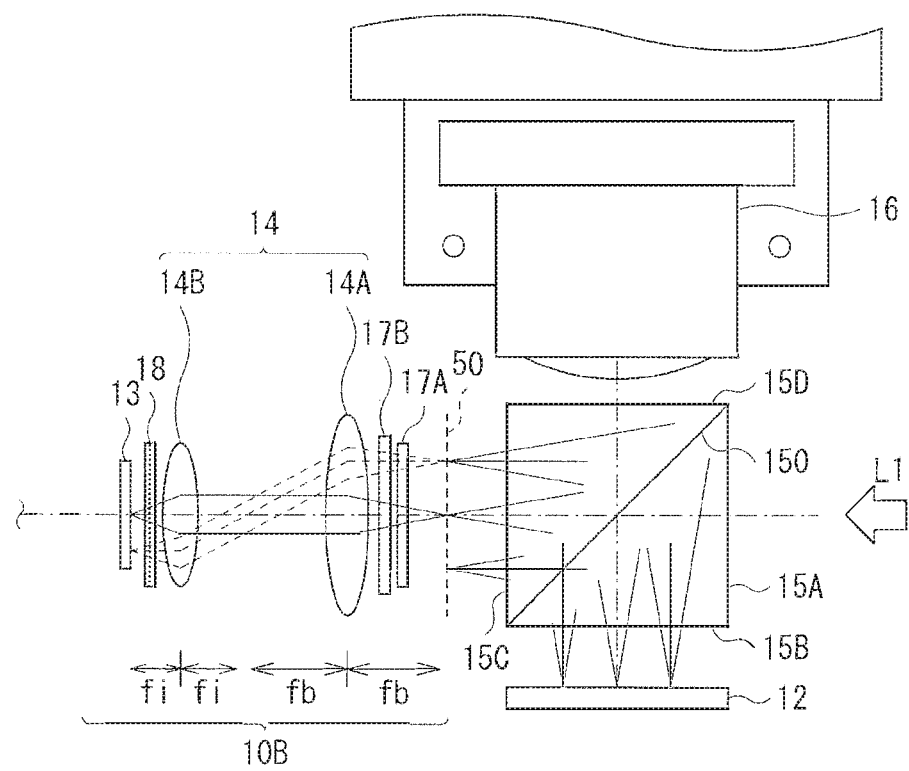

[ FIG. 7 ]
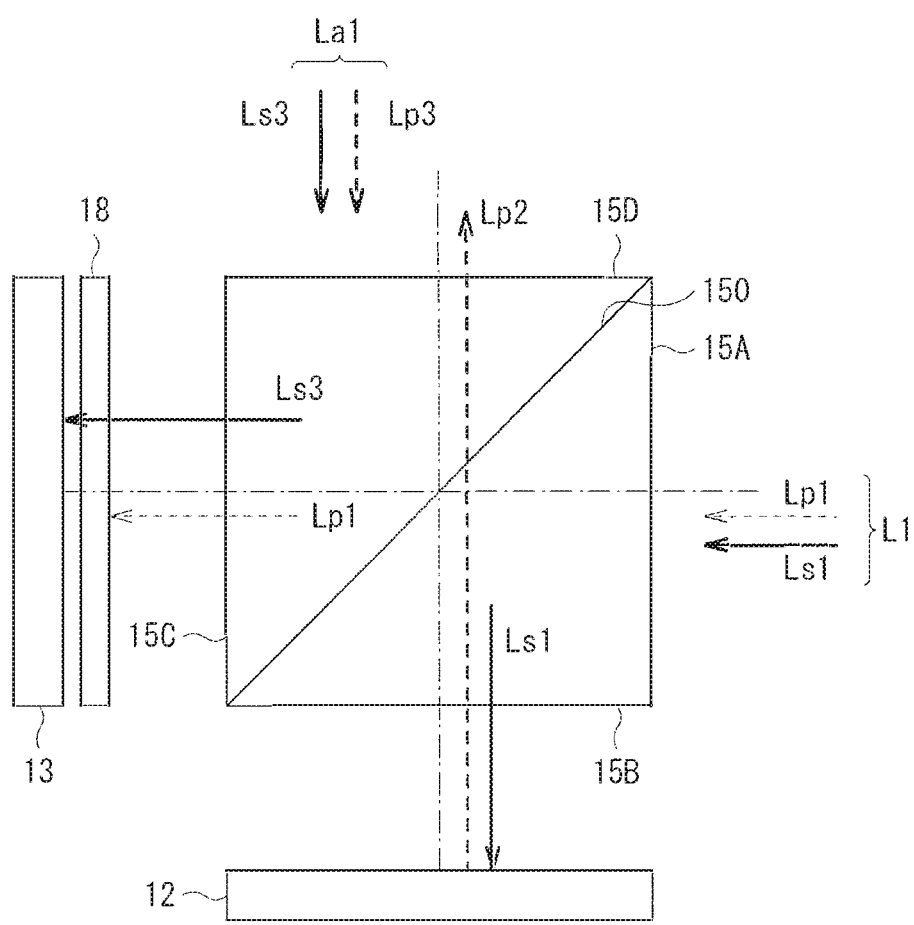

[FIG. 8A]
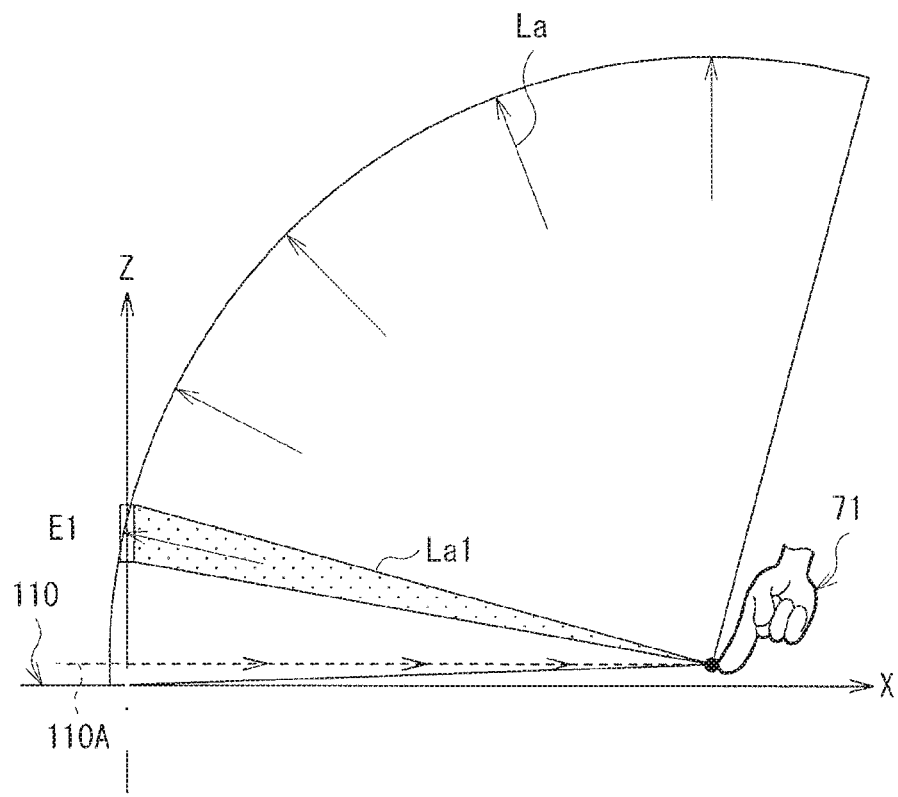
[FIG. 8B]
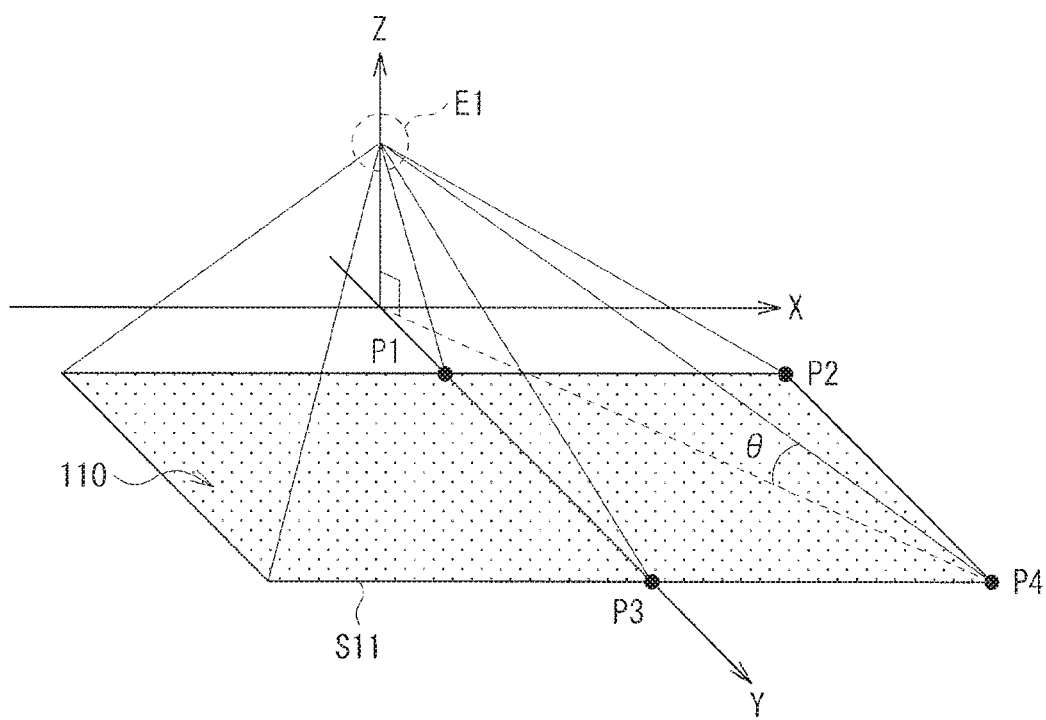

[ FIG. 8C ]
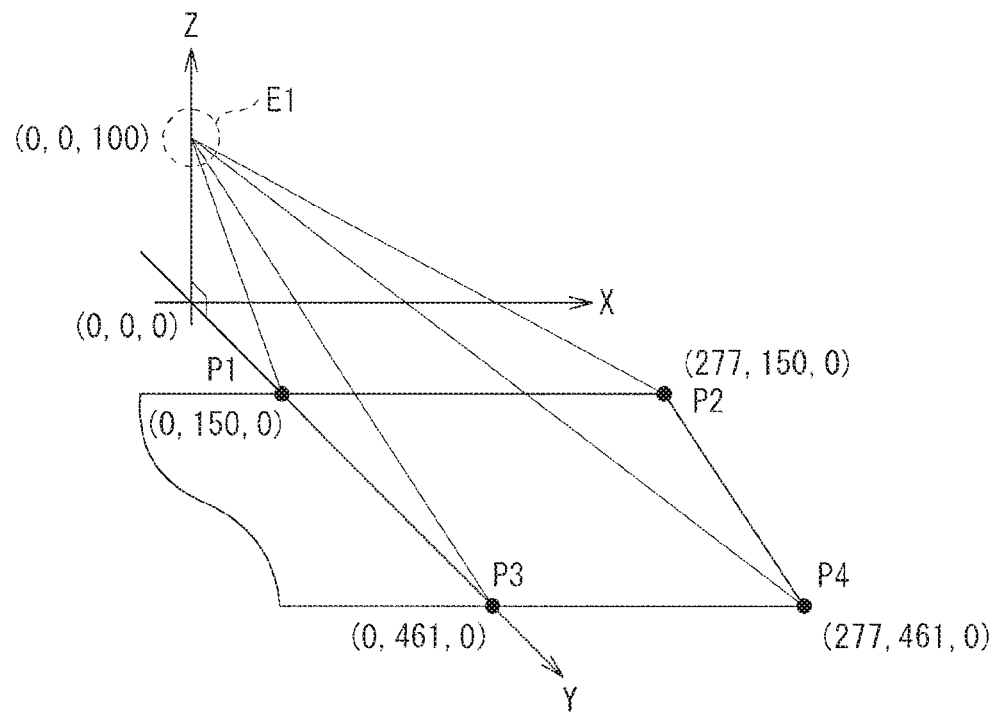
[ FIG. 9 ]
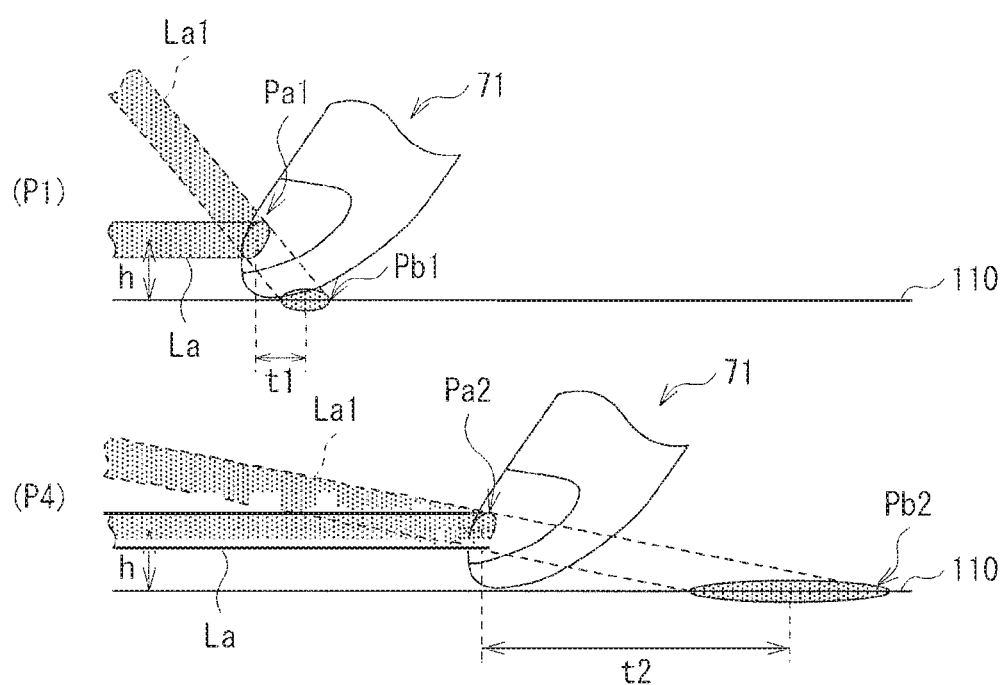

[ FIG. 10A ]
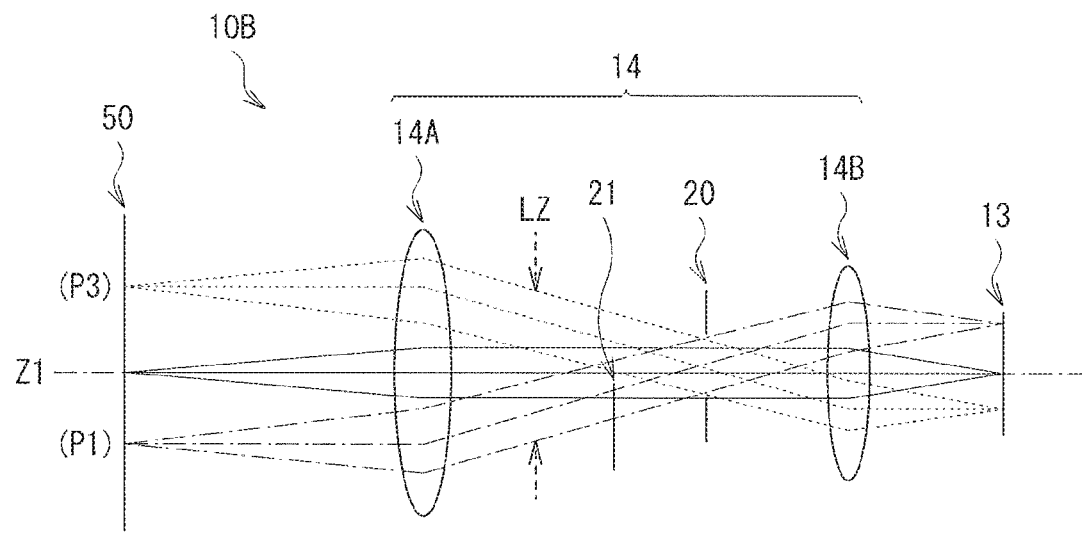
[ FIG. 10B ]
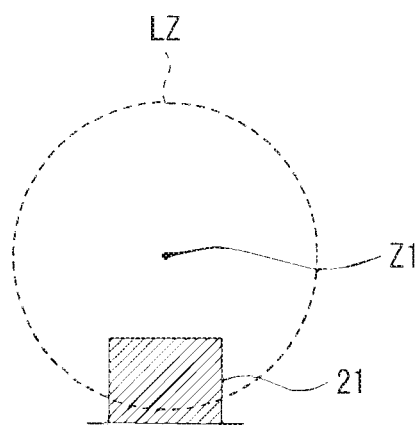

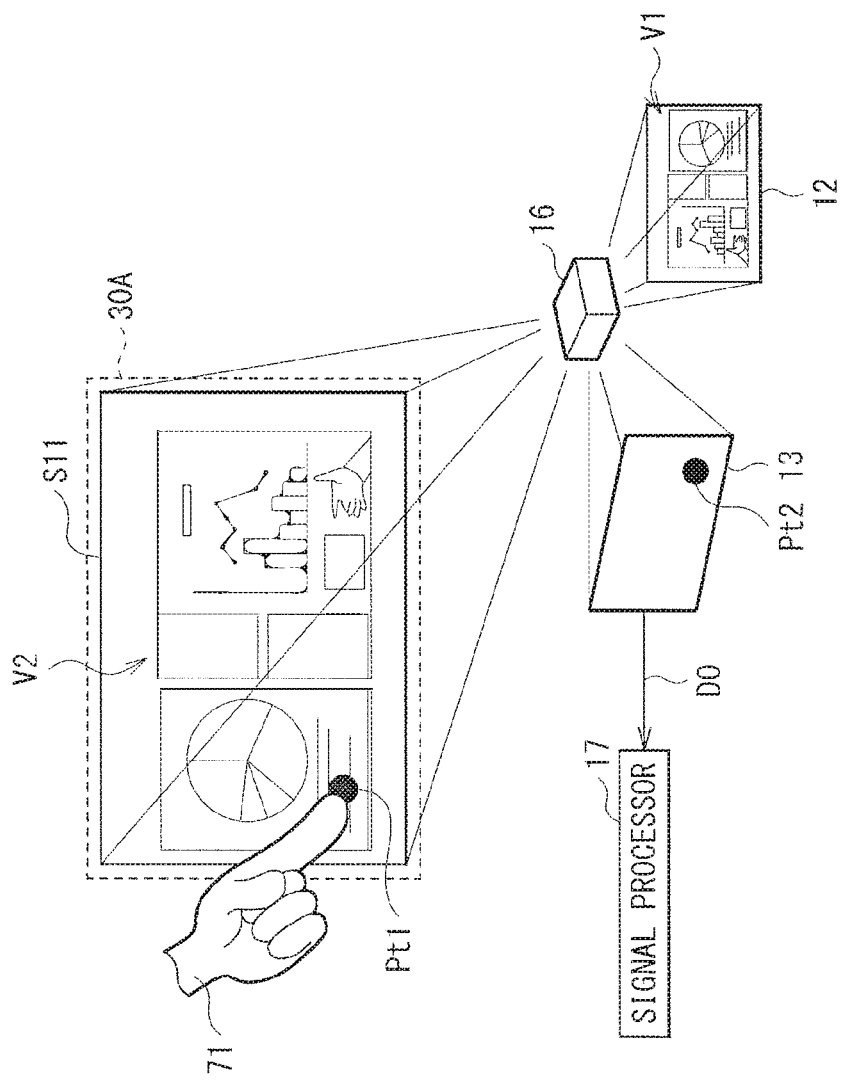
[ FIG. 11 ]

[ FIG. 12 ]
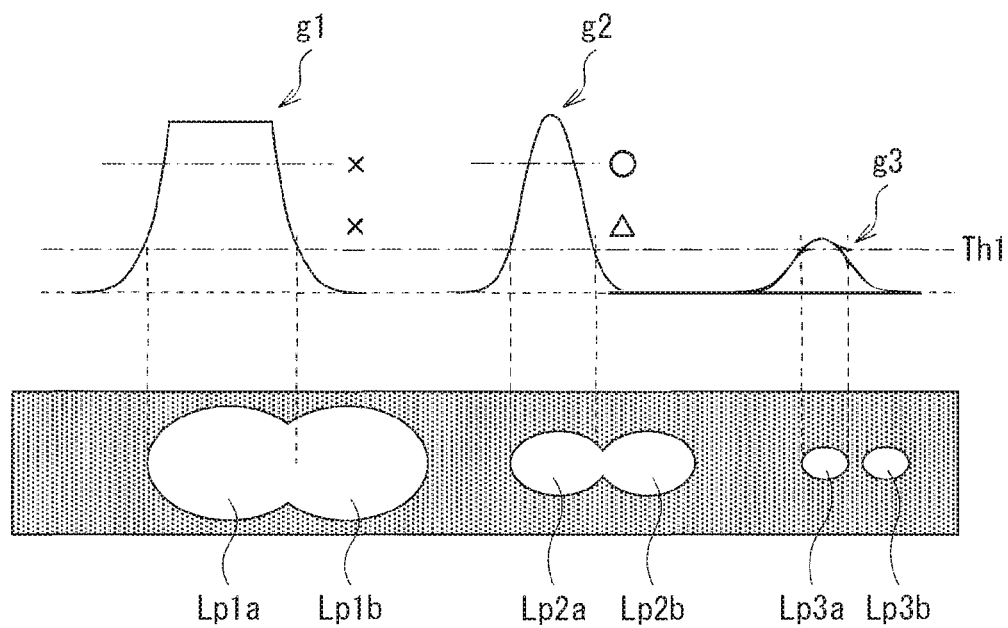
[ FIG. 13 ]
COMPARATIVE EXAMPLE
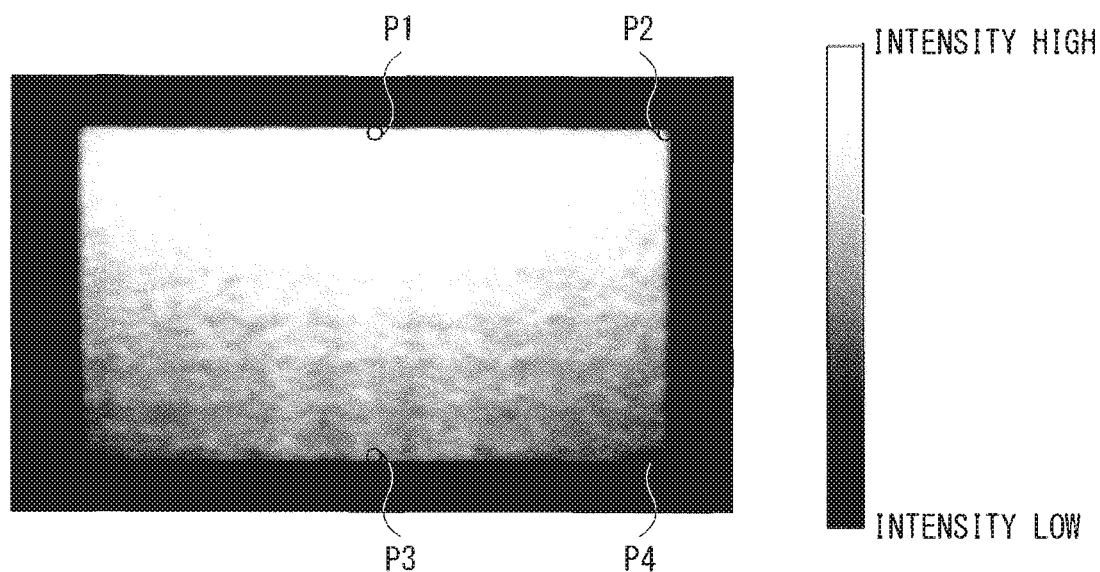

[ FIG. 14 ]
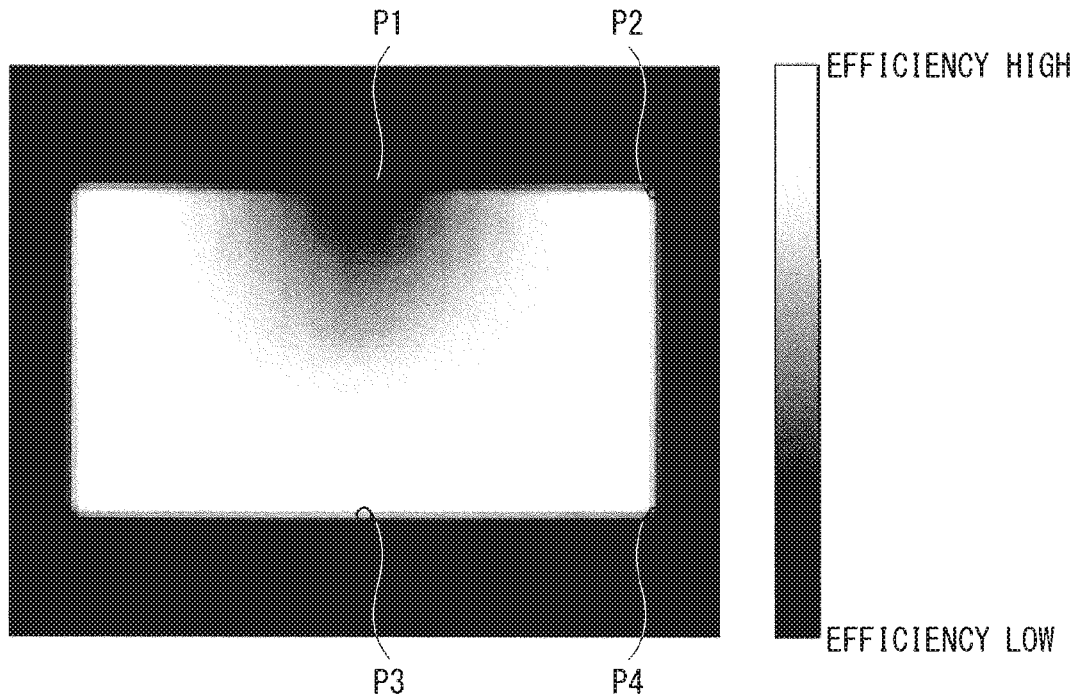
[ FIG. 15 ]
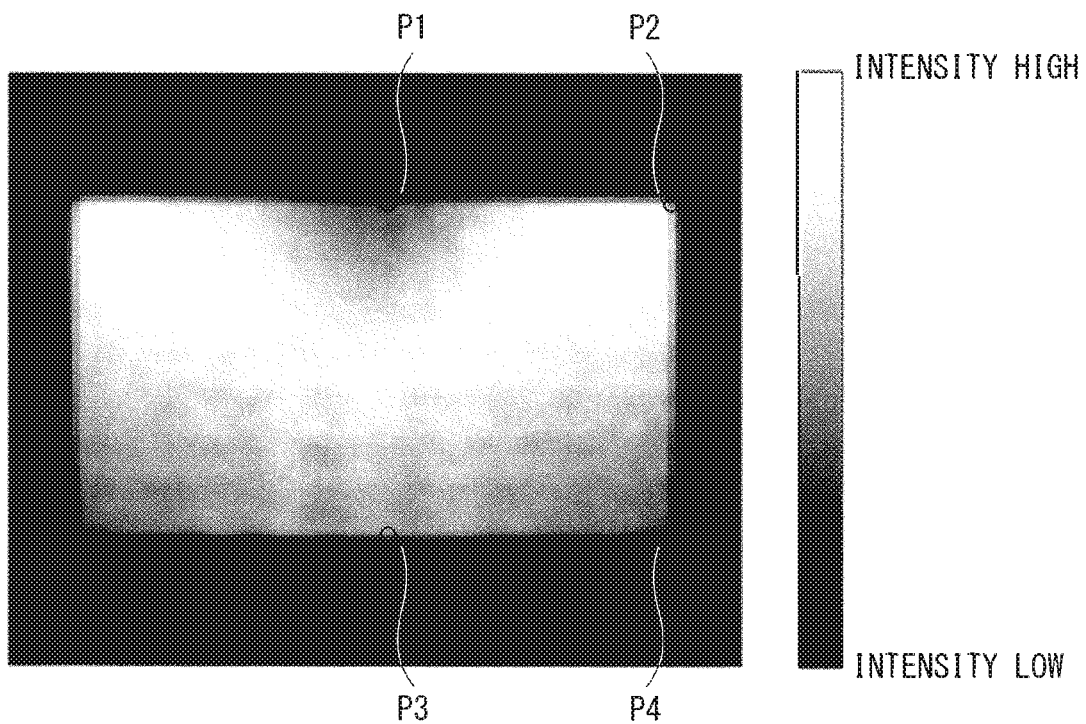

[ FIG. 16 ]
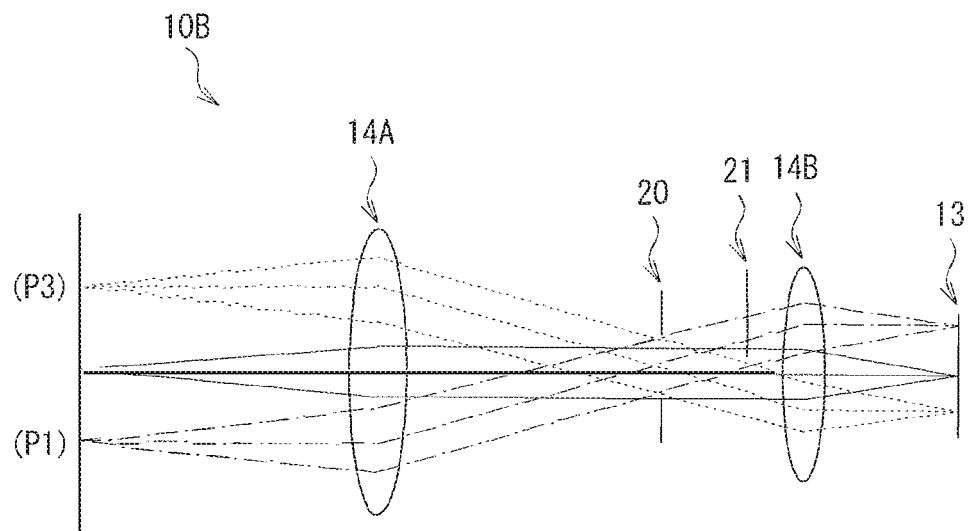
[ FIG. 17 ]
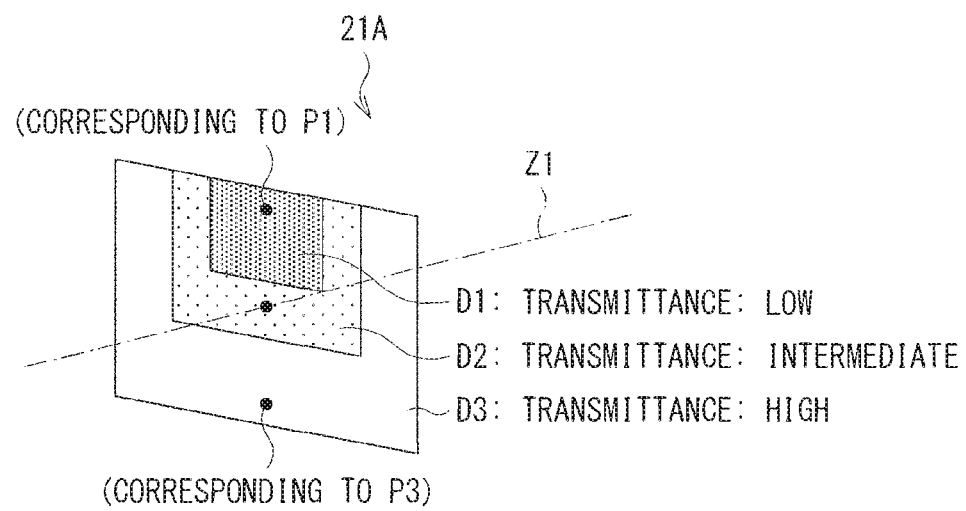

[FIG. 18]
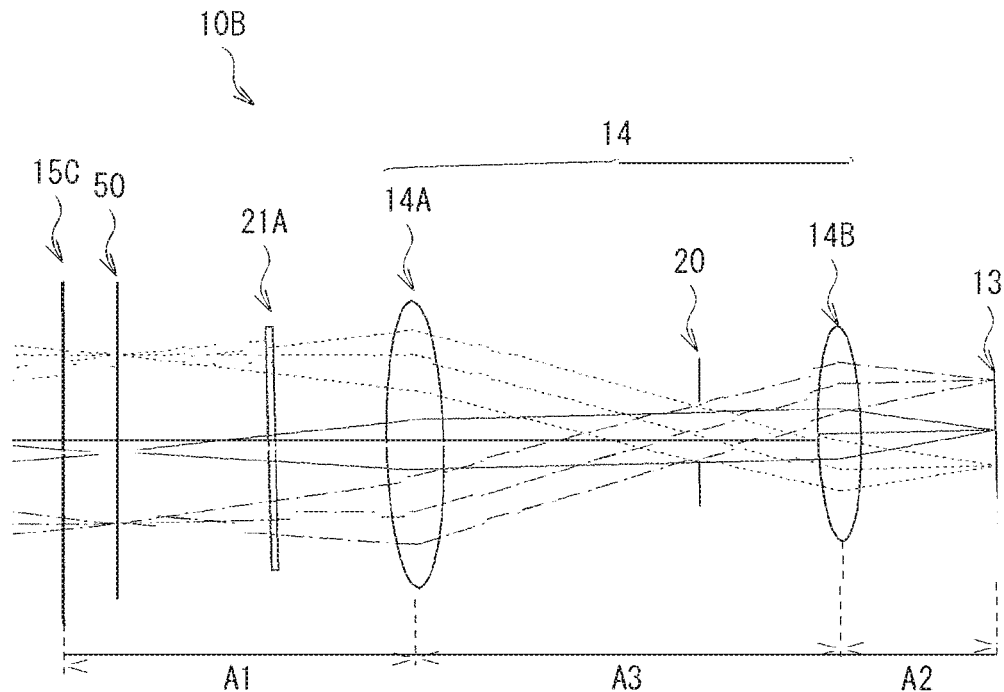
[FIG. 19]
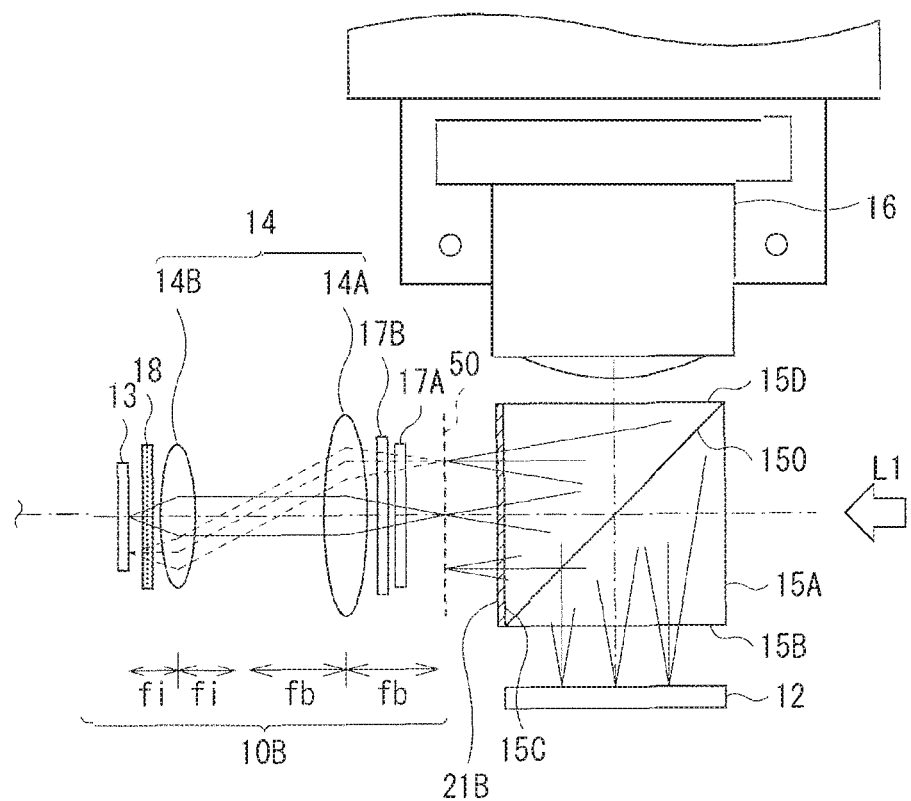

PROJECTION DISPLAY UNIT

CROSS REFERENCE TO RELATED APPLICATION

The present application is a continuation application of U.S. patent application Ser. No. 15/502,917 filed on Feb. 9, 2017, which is a national stage entry of PCT/JP2015/070910, filed Jul. 23, 2015, which claims the benefit of priority of the Japanese Patent Application No. 2014-172425 filed in the Japan Patent Office on Aug. 27, 2014, the entire contents of which are incorporated herein by reference.

TECHNICAL FIELD

The disclosure relates to a projection display unit having a detection function.

BACKGROUND ART

In recent years, for example, a smartphone or a tablet terminal may include a touch panel, thereby allowing, for example, page-turning, zooming-in, or zooming-out of an image displayed on a screen to be performed by an intuitive pointing operation. On the other hand, as a display unit that performs display by projecting an image onto a screen, a projector (a projection display unit) has been long known. There is proposed a technology to add a detection function such as that of a touch panel to the projector, for example, as disclosed in PTLs 1 and 2.

CITATION LIST

Patent Literature

PTL 1: Japanese Unexamined Patent Application Publication No. 2007-52218
PTL 2: Japanese Unexamined Patent Application Publication No. 2003-44839

SUMMARY OF INVENTION

In a projector described in PTL 1, image projection by a projection optical system and taking-in of detection invisible light by a detection optical system are performed with a single projection lens. Further, a light valve that produces an image and an imaging device that receives the invisible light are disposed in positions that are optically conjugate with each other. Such a unit configuration allows for accurate object detection without performing a complicated process such as calibration. An interactive device is achievable with a simple configuration.

However, such a unit configuration in which a light source applies invisible light toward a projection surface, for example, may involve an issue that signal intensity based on the applied invisible light is uneven in a light reception surface, leading to degradation of detection accuracy.

Accordingly, it is desirable to provide a projection display unit that is able to increase detection accuracy.

A projection display unit according to one embodiment of the disclosure includes a projection optical system, a polarization separation device, and a detection optical system. The projection optical system includes an illuminator, a projection lens, and a light valve. The light valve modulates illumination light supplied from the illuminator on the basis of an image signal, and outputs the modulated illumination light toward the projection lens. The polarization separation device is disposed between the light valve and the projection lens. The polarization separation device separates entering light into a first polarized component and a second polarized component, and outputs the first polarized component and the second polarized component in respective directions that are different from each other. The detection optical system includes an imaging device and a reduction optical system. The imaging device is disposed in a position that is optically conjugate with a position of the light valve. The reduction optical system is disposed between the imaging device and the polarization separation device. The imaging device receives, via the projection lens and the polarization separation device, light based on detection invisible light. A transmittance adjuster is disposed between the polarization separation device and the imaging device. The transmittance adjuster adjusts transmittance of at least part of a bundle of passing light rays derived from the invisible light.

In the projection display unit according to the embodiment of the disclosure, the imaging device is disposed in the position that is optically conjugate with the position of the light valve, and the imaging device receives, via the projection lens and the polarization separation device, the light based on the invisible light, i.e., part of the invisible light reflected by an object. The transmittance adjuster is provided between the polarization separation device and the imaging device. The transmittance adjuster adjusts the transmittance of at least part of the bundle of passing light rays derived from the invisible light. This reduces unevenness of signal intensity in a light reception surface of the imaging device, which may be attributable to an application intensity distribution of the invisible light, for example.

According to the projection display unit of the embodiment of the disclosure, the imaging device disposed in the position optically conjugate with the position of the light valve receives the light based on the invisible light via the projection lens and the polarization separation device, and the transmittance adjuster that adjusts the transmittance of at least part of the bundle of passing light rays derived from the invisible light is provided between the polarization separation device and the imaging device. Accordingly, it is possible to reduce unevenness of signal intensity in the light reception surface of the imaging device. As a result, it is possible to improve detection accuracy.

It is to be noted that the above description is mere example of the disclosure. Effects of the disclosure are not limited to the effects described above, and may be different from the effects described above, or may further include any other effect.

BRIEF DESCRIPTION OF DRAWINGS

FIG. 1 schematically illustrates an appearance and a usage state of a projection display unit according to one embodiment of the disclosure.

FIG. 2 is a block diagram illustrating a functional configuration of the projection display unit illustrated in FIG. 1.

FIG. 3 is a schematic side view of the state illustrated in FIG. 1.

FIG. 4 illustrates a configuration example of a near-infrared light source illustrated in FIG. 1.

FIG. 5A is a perspective view of a first configuration example of a cylinder array lens.

FIG. 5B is a perspective view of a second configuration example of the cylinder array lens.

FIG. 6 illustrates a configuration of a key part of the projection display unit illustrated in FIG. 1.

FIG. 7 schematically illustrates a configuration example of a polarization separation device together with states of entering light and output light.

FIG. 8A schematically illustrates a concept of taking-in of detection light.

FIG. 8B schematically describes a difference in take-in angle between detection positions.

FIG. 8C schematically illustrates an example of detection position coordinates.

FIG. 9 schematically describes a difference between a reflection point and a virtual light emission point of the detection light.

FIG. 10A illustrates a configuration of a key part for describing an arrangement of a blocking plate.

FIG. 10B schematically describes a shape of a plane, of the blocking plate, that is perpendicular to an optical axis, etc.

FIG. 11 schematically illustrates a concept of image display and object detection of the projection display unit illustrated in FIG. 1.

FIG. 12 schematically describes setting of a threshold value upon object detection and signal intensity.

FIG. 13 illustrates a signal intensity distribution according to a comparative example.

FIG. 14 illustrates a distribution of efficiency of reaching the imaging device in a case where the blocking plate is used.

FIG. 15 illustrates a signal intensity distribution in the case where the blocking plate is used.

FIG. 16 illustrates a configuration of a key part for describing an arrangement of the blocking plate according to Modification 1.

FIG. 17 schematically describes a partially-transmitting mask according to Modification 2.

FIG. 18 illustrates a configuration of a key part for describing an arrangement of the partially-transmitting mask illustrated in FIG. 17.

FIG. 19 illustrates a configuration of a key part for describing a partially-transmitting film according to Modification 3.

MODES FOR CARRYING OUT THE INVENTION

Some embodiments of the disclosure are described in detail below referring to the accompanying drawings. It is to be noted that the description is given in the following order.
1. Embodiment (An example of a projection display unit in which a blocking plate that partially blocks a bundle of passing light rays is disposed between relay lenses in a reduction optical system)
2. Modification 1 (Another arrangement example of the blocking plate)
3. Modification 2 (An example of a partially-transmitting mask)
4. Modification 3 (An example of a partially-transmitting film)

1. Embodiment

Configuration

FIG. 1 illustrates an appearance and a usage state of a projection display unit (a projection display unit 1) according to one embodiment of the disclosure. FIG. 2 illustrates a functional configuration of the projection display unit 1. The projection display unit 1 may be, for example, a projector of a type (a so-called ultra-short throw type) that projects an image onto the vicinity of its own while being placed on a flat surface such as a top of a table (or while being mounted on, for example, a wall surface). The projection display unit 1 may also have a function of actively performing object detection in addition to the image display function. As illustrated in FIG. 1, a predetermined input operation is allowed to be performed by performing an operation in a way such as touching a displayed image with a finger (an indicator 71) in a projection region (a projection region S11) onto which an image is projected, as will be described in detail later.

Referring to FIG. 2, the projection display unit 1 may include an illuminator 11, a light valve 12, an imaging device 13, a reduction optical system 14, a polarization separation device 15, a projection lens 16, and a signal processor 17. Out of the foregoing members, for example, the illuminator 11, the light valve 12, and the projection lens 16 may configure a projection optical system 10A. Further, for example, the imaging device 13 and the reduction optical system 14 may configure a detection optical system 10B. It is to be noted that, for example, driving of the illuminator 11, the light valve 12, the imaging device 13, and the signal processor 17 may be controlled by an unillustrated system controller at predetermined timings.

The projection display unit 1 may include a casing provided with a near-infrared light source 40. The near-infrared light source 40 may be a laser light source that outputs near-infrared (NIR) light as invisible light for detection, and apply the near-infrared light in an in-plane direction of a plane in the vicinity of a projection surface 110. In other words, the near-infrared light source 40 may provide, in the vicinity of the projection surface 110, a barrier (a detection light plane 110A) of the near-infrared light so as to cover the projection region S11. Referring to FIG. 3, the detection light plane 110A may be provided in a plane at a predetermined height "h" from the projection surface 110. The predetermined height "h" may be different from a height of an optical axis that passes through the projection lens 16. Further, the detection light plane 110A may be provided to expand in a radial manner from the near-infrared light source 40 (from a dot-shaped region or an extremely-small region) so as to cover the projection region S11.

To give an example, the detection light plane 110A may be provided, for example, with a thickness (a width in a height direction) from 2 mm to 3 mm in a position at the height "h" of about several millimeters to about several tens of millimeters. Further, the detection light plane 110A may cover the projection region S11 in an in-plane direction. In general, the projection surface 110 is flat. Therefore, in the absence of any blocking object or the indicator 71 such as a finger and a pointer, the detection light plane 110A is not blocked. In other words, the imaging device 13 monitoring the projection surface 110 may not capture the indicator 71. In this state, when, for example, a finger is brought near the projection surface 110, or performs an operation such as touching the projection surface 110, the near-infrared light of the detection light plane 110A may be blocked by the finger, and be thereby reflected and diffused. The light reflected by the finger may travel in various directions. However, part of the reflected light may be taken in by an aperture of the projection lens 16. This entering light may reach the imaging device 13 via the projection lens 16 and the polarization separation device 15. At this time, bright spot diffusion points each occurring in a dot shape on the projection surface 110 may be focused onto a position, on the imaging device 13, corresponding to a position in a plane of the projected image, because the imaging device 13 is disposed in the position that is optically conjugate with the position of the light valve 12 that forms an image. This allows for detection of a position of an object. Moreover, the ultra-short throw type may be advantageous in visibility of a screen upon performing of an operation. One reason for this is that projection light of the ultra-short throw type travels the vicinity of the projection surface 110, which is more difficult to be blocked by part of a body of a person who performs an operation.

It is to be noted that the near-infrared light source 40 may be provided, for example, at a lower part of the casing of the projection display unit 1 as illustrated; however, the near-infrared light source 40 may be disposed adjacent to the projection display unit 1 or may not be disposed adjacent to the projection display unit 1. The near-infrared light source 40 may be disposed in a position away from the projection display unit 1 as long as the detection light plane 110A is so provided as to cover the projection region S11. Alternatively, the near-infrared light source 40 may be disposed inside the casing (an enclosure) of the projection display unit 1. In the present embodiment, the near-infrared light source 40 is allowed to be disposed at a height relatively away from the projection surface 110 owing to optical design that will be described later. This makes it easier to bundle the near-infrared light source 40 integrally with the projection display unit 1.

The foregoing detection light plane 110A may achieve a mechanism in which, when an object (the indicator 71) is brought into contact with or brought near the projection surface 110, the near-infrared light is reflected (reflected and diffused) by the indicator 71, and part of the reflected light is taken in by the projection display unit 1 as the detection light.

Referring to FIG. 4, the near-infrared light source 40 may include a near-infrared laser 42, a collimator lens 43, and a cylinder array lens 44, for example. Near-infrared light 41 outputted from the cylinder array lens 44 may provide the detection light plane 110A. Referring to FIG. 5A, the cylinder array lens 44 may include an array of a plurality of convex cylinder lenses. The cylinder array lens 44 may be so disposed that a generatrix 44A of each of the cylinder lenses faces a plane perpendicular to the projection surface 110. It is to be noted that, instead of the convex cylinder array lens 44, a cylinder array lens 45 including an array of a plurality of concave cylinder lenses as illustrated in FIG. 5B may be used.

The illuminator 11 may output illumination light L1 toward the light valve 12 via the polarization separation device 15. The illuminator 11 is not specifically limited as long as the illuminator 11 outputs visible light as the illumination light L1. For example, the illuminator 11 may include an unillustrated blue laser, an unillustrated green laser, and an unillustrated red laser.

Referring to FIG. 2 and FIGS. 6 to 13, a configuration of a key part of the projection display unit 1 is described below.

Projection Optical System 10A

The light valve 12 may be a reflective liquid crystal device such as liquid crystal on silicon (LCOS), for example. The light valve 12 may modulate a first polarized component (for example, an s-polarized component Ls1 described later) included in the illumination light L1, on the basis of image data, for example. A polarization state of the light modulated by the light valve 12 may be rotated to be converted into a second polarized component (for example, a p-polarized component Lp1 described later). This modulated light is outputted toward the projection lens 16 via the polarization separation device 15. It is to be noted that the light valve 12 may allow for black display by returning entering light (the s-polarized component Ls1) to the polarization separation device 15 without changing the polarization state thereof. A planar shape of an effective region (an effective region A1 described later) of the light valve 12 may be rectangular, for example.

The projection lens 16 may project, onto the projection surface 110, light (image light L2) having entered from the light valve 12 via the polarization separation device 15. The projection lens 16 may be an ultra-short throw lens with a throw ratio of 0.38 or smaller, for example. It is to be noted that the throw ratio is expressed by L/H where L is a distance from the projection lens 16 to the projection surface 110, and H is a width of the projection region S11. Referring to FIGS. 2 and 6, the projection lens 16 may receive the detection light (near-infrared light La1) from a direction opposite to a traveling direction of the modulated light. In the present embodiment, the detection light may be taken in via the projection lens 16 of the projection optical system 10A to be guided to the detection optical system 10B as described above.

Polarization Separation Device 15

The polarization separation device 15 separates entering light into the first polarized component (for example, the s-polarized component) and the second polarized component (for example, the p-polarized component), and outputs the first polarized component and the second polarized component in respective directions that are different from each other. The polarization separation device 15 may include a polarizing beam splitter (PBS), for example. The polarization separation device 15 may selectively reflect the first polarized component (reflect the first polarized component by a polarization separation surface 150) and allow the second polarized component to selectively pass therethrough (pass through the polarization separation surface 150). The present embodiment is described referring to an example case in which the polarizing beam splitter is used as the polarization separation device 15. However, the polarization separation device 15 is not limited to the polarizing beam splitter, and may include a wire grid. In this case, the wire grid has different characteristics from those of the polarizing beam splitter, therefore selectively reflecting the p-polarized component as the first polarized component of entering light and allowing the s-polarized component as the second polarized component to selectively pass therethrough.

Referring to FIG. 6, the polarization separation device 15 may have four optical surfaces (a first surface 15A, a second surface 15B, a third surface 15C, and a fourth surface 15D) and the polarization separation surface 150, for example. The first surface 15A and the third surface 15C may face each other in a uniaxial direction (a right-left direction in the diagram), and the second surface 15B and the fourth surface 15D may face each other in a uniaxial direction (a top-bottom direction in the diagram). In such a configuration, the first surface 15A may receive the illumination light L1, and the second surface 15B may face the light valve 12. The third surface 15C may face the detection optical system 10B. The fourth surface 15D may face the projection lens 16.

FIG. 7 illustrates a configuration example of the polarization separation device 15. As illustrated, the polarization separation device 15 may reflect the first polarized component (the s-polarized component Ls1) out of the illumination light L1 having entered the polarization separation device 15 from the first surface 15A to output the reflected light from the second surface 15B. Meanwhile, the polarization separation device 15 may output, from the third surface 15C, the second polarized component (the p-polarized component Lp1) out of the illumination light L1. Further, the polarization separation device 15 may output, from the fourth surface 15D, the second polarized component (a p-polarized component Lp2) out of light having entered the polarization separation device 15 from the second surface 15B (the light modulated by the light valve 12). This may allow for image projection by the projection optical system 10A. Meanwhile, the polarization separation device 15 may reflect the first polarized component (an s-polarized component Ls3) out of light (the near-infrared light La1) having entered the polarization separation device 15 from the fourth surface 15D to output the reflected light from the third surface 15C. The s-polarized component Ls3 may be received by the detection optical system 10B, and light based on the foregoing s-polarized component Ls3 may be received by the imaging device 13. Thus, an imaging signal D0 may be obtained by the imaging device 13.

Detection Optical System 10B

The imaging device 13 is disposed in a position that is optically conjugate with a position of the light valve 12. More specifically, when the light valve 12 is a reflective liquid crystal device, the imaging device 13 may be so disposed that a display surface (a liquid crystal surface) where an image is produced and an imaging surface of the imaging device 13 are in a relationship optically conjugate with each other. The imaging device 13 may include a solid-state imaging device such as a complementary metal-oxide semiconductor (CMOS) and a charge coupled device (CCD). A planar shape of an effective region (an effective region A2 described later) of the imaging device 13 may be rectangular, for example.

Referring to FIG. 6, an example of the detection optical system 10B including the foregoing imaging device 13 may include a visible light cut filter 17A, a bandpass filter 17B, the reduction optical system 14 (relay lens groups 14A and 14B), a polarizer 18, and the imaging device 13 that are disposed in order from a conjugate plane 50 side, for example.

The visible light cut filter 17A may reduce a visible light component of entering light. Provision of the visible light cut filter 17A may make it possible to cut a large quantity of the illumination light L1 to enter the imaging device 13 without turning off a light source of the illuminator 11, even if the polarizing beam splitter is used as the polarization separation device 15. This may allow nearly only the detection light to enter the imaging device 13, increasing an S/N ratio to improve detection accuracy. It is to be noted that one visible light cut filter 17A may be provided in this example; however, the number of the visible light cut filter is not limited to one, and may be two or more. Moreover, the visible light cut filter 17A may be disposed in a position between the conjugate plane 50 and the reduction optical system 14 in this example; however, the visible light cut filter 17A may be disposed in another position, for example, in a position between the reduction optical system 14 and the imaging device 13.

The bandpass filter 17B may allow a specific wavelength (near-infrared light) to selectively pass therethrough and reduce other wavelengths.

The polarizer 18 may be an optical member that reduces the second polarized component included in the illumination light L1. In this example, the polarization separation device 15 as described above may allow the second polarized component (for example, the p-polarized component) out of the illumination light L1 to pass therethrough, allowing the p-polarized component to enter the detection optical system 10B. This may influence an S/N ratio of the imaging signal obtained in the imaging device 13. Provision of the polarizer 18 as in the present embodiment may cut the second polarized component (for example, the p-polarized component) included in the illumination light L1, thereby increasing the S/N ratio. It is to be noted that the position of the polarizer 18 is not limited to the illustrated position between the reduction optical system 14 and the imaging device 13. The polarizer 18 may be disposed in another position, for example, a position between the conjugate plane 50 and the reduction optical system 14.

The reduction optical system 14 may include one or a plurality of relay lens groups (two relay lens groups 14A and 14B, in this example). Each of the relay lens groups 14A and 14B may have positive power, and include at least one lens. A focal length fi of the relay lens group 14B may be so set as to be smaller than a focal length fb of the relay lens group 14A. For example, on condition that 2fi is equal to fb (2fi=fb), the relay lens group 14A may be disposed in a position away from the conjugate plane 50 of the light valve 12 by the focal length fb, the relay lens group 14B may be disposed in a position away from the foregoing position of the relay lens group 14A by (fb+fi), and the imaging device 13 may be disposed in a position away from the relay lens group 14B by the focal length fi. Such an arrangement of the relay lens groups 14A and 14B may be equivalent to a case where the imaging device 13 is disposed on the conjugate plane 50 while achieving a reduction optical system. In other words, it is possible to further reduce the size of the imaging device 13 while maintaining a positional relationship conjugate with the light valve 12.

Object detection by means of the foregoing reduction optical system 14 may be advantageous to cost reduction. The cost of the imaging device 13 may be greatly influenced by the size of the imaging device 13. Cost of configuring the projector is weighted heavily toward the light valve 12 and the imaging device 13 as semiconductor components. Therefore, a size reduction in such components may be advantageous in terms of cost. Moreover, object detection by means of the foregoing reduction optical system 14 may be advantageous in increased flexibility of arrangement attributed to extension of a conjugate point by a relay optical system. For example, spacing between components may be provided, allowing for a bending optical system by providing a reflective mirror in the spacing.

In the present embodiment, the foregoing configuration includes a transmittance adjuster (for example, a blocking plate 21 described later) disposed between the polarization separation device 15 and the imaging device 13. The transmittance adjuster adjusts transmittance of at least part of a bundle of passing light rays derived from the near-infrared light. One reason for this is described below.

First, an outline of taking-in of the near-infrared light is described. As schematically illustrated in FIG. 8A, when the indicator 71 such as a finger is brought into contact with the projection surface 110 or is brought near the projection surface 110, the near-infrared light La of the detection light plane 110A provided in the vicinity of the projection surface 110 may reach the indicator 71 and be reflected and diffused in various directions. Specifically, the near-infrared light La may be diffused in a range that is on the upper side of the projection surface 110, is on the forward side of the indicator 71, and corresponds to one-fourth of a solid angle of a whole sphere. Part (the near-infrared light La1) of the foregoing reflected and diffused light (scattered light) may be collected by the projection lens 16, and thereafter, the collected light may be taken in by an exit pupil E1 of the detection optical system 10B.

A detailed description is given below of the near-infrared light La1 to be taken in by the detection optical system 10B. Referring to FIG. 8B, upon detection of a position of an object on the projection surface 110, a take-in angle of the near-infrared light La1 (an angle θ formed by the projection surface 110 and the near-infrared light La1 to enter the exit pupil E1 of the detection optical system 10B) may differ depending on the detection position. Specifically, the exit pupil E1 may be in a position in an upper direction as if being looked up from below when seen from a position P1 that is nearest to the exit pupil E1. The take-in angle θ may be therefore the largest in the position P1. Further, the take-in angle θ may gradually decrease in positions P2 and P3 in order, which are farther from the exit pupil E1 in order. The take-in angle θ may be the smallest in a position P4 which is farthest from the exit pupil E1.

FIG. 8C and the following Tables 1 to 3 describe an example. Table 1 describes projection conditions. It is to be noted that the exit pupil E1 may be provided at a height of 100) mm from the projection surface 110 such as a screen and a floor. FIG. 8C describes a position coordinate (X, Y, Z) of each of the positions P1 to P4 in the projection region S11 provided on the foregoing projection conditions. Further, Table 2 describes a distance to the exit pupil E1 together with the position coordinate (X, Y, Z) of each of the positions P1 to P4. Further, Table 3 describes an angle (the take-in angle θ) formed by the projection surface 110 and the exit pupil E1 in each of the positions P1 to P4. As can be appreciated, the take-in angle θ may vary depending on the distance from the exit pupil E1. The take-in angle θ is the greatest (θ=33.7°) in the position P1, and is the smallest (θ=10.5°) in the position P4. Further, the take-in angle θ is 17.6° in the position P2, and is 12.2° in the position P3.

TABLE 1

| Projection conditions | |
| --- | --- |
| Projection size | 25 inches |
| Aspect ratio | 16:9 |
| Diagonal size | 635 mm |
| Horizontal size | 553 mm |
| Vertical size | 311 mm |

TABLE 2

| Distance to exit pupil (mm) | | | | |
| --- | --- | --- | --- | --- |
| Detection position | X | Y | Z | Distance |
| P1 | 0 | 150 | 100 | 180 |
| P2 | 277 | 150 | 100 | 330 |
| P3 | 0 | 461 | 100 | 472 |
| P4 | 277 | 461 | 100 | 547 |

TABLE 3

| Angle θ (°) formed with exit pupil | |
| --- | --- |
| P1 | 33.7 |
| P2 | 17.6 |
| P3 | 12.2 |
| P4 | 10.5 |

As can be appreciated from above, the distance to the exit pupil E1 and the take-in angle θ may vary depending on the detection position. Values of the foregoing respective parameters themselves may differ depending on, for example, the size of the projection region S11, or ultra-short throw type lens design. However, the relative relationship in magnitude of the take-in angle θ depending on the detection position described above does not vary. This relationship is therefore utilized to identify the position of the indicator 71.

It is to be noted that a shift (a difference) may be actually present between a reflection position of the near-infrared light La1 and a virtual light emission position seen from a view point of the imaging device 13. For reference, FIG. 9 schematically illustrates a state of reflection near the indicator 71. An upper diagram illustrates reflection in the position P1, and a lower diagram illustrates reflection in the position P4. As illustrated in FIG. 9, the near-infrared light La of the detection light plane 110 may reach the indicator 71 and be reflected by the indicator 71. However, in fact, from a view point of the exit pupil E1 (the projection lens 16), the near-infrared light La1 may be seen as if light is emitted from points (virtual light emission points Pb1 and Pb2) on the projection surface 110 that are located farther, by an oblique component of the height "h", than reflection points (actual application points) Pa1 and Pa2 at which the near-infrared light La1 actually reaches the indicator 71. In other words, a difference t1 may be present between the reflection point Pa1 corresponding to the actual position of the indicator 71 and the virtual light emission point Pb1. Similarly, a difference t2 may be present between the reflection point Pa2 and the virtual light emission point Pb2. Further, these differences (elongated amounts of the detection positions) may each be influenced by the detection position, i.e., the take-in angle θ. The differences may each be greater as the take-in angle θ is smaller. In this example, the take-in angle θ in the position P4 may be the smallest. Therefore, the difference t2 of the position P4 may have the maximum value. It is to be noted that the take-in angle θ in the position P1 may be the greatest, and the difference t1 of the position P1 may therefore have the minimum value.

As described above, upon the object detection, part of reflection light from a finger (the indicator 71) may be collected by the projection lens 16 (taken in by the projection lens 16) to be received by the imaging device 13. In other words, reflection light that is not collected by the projection lens 16 may be present, which does not contribute to the imaging signal. Accordingly, efficiency of taking-in of the reflection light (the near-infrared light) to the projection lens 16 (the exit pupil E1) may influence signal intensity obtained in the imaging device 13.

Taking-In Efficiency

The taking-in efficiency of the near-infrared light is described in detail. The near-infrared light La1 reflected by the indicator 71 may be taken into the exit pupil E1 to enter the detection optical system 10B. A solid angle ω at which the near-infrared light La1 is taken into the exit pupil E1 at that time may be expressed by the following expression (1).

Specifically, the solid angle ω may be expressed with a radius of the exit pupil E1, a distance to the exit pupil E1 (Table 2), and a cosine component of an angle formed thereby. A ratio of the solid angle ω to a range of one-fourth of the whole sphere (4π) may correspond to the taking-in efficiency (CE), which is expressed by the following expression (2).

$$\omega = \text{(the radius of the exit pupil } E1) \cdot \text{(the cosine component)}/\text{(the distance to the exit pupil } E1)^2 \quad (1)$$

$$CE = \omega/(4\pi/4) \quad (2)$$

Table 4 describes a radius of the exit pupil in each of the positions P1 to P4. Table 5 describes the taking-in efficiency in each of the positions P1 to P4. It is to be noted that each numerical value is a value normalized by a value in the position P3 as 1.

TABLE 4

| Exit pupil size (Normalized) | |
| --- | --- |
| P1 | 0.09 |
| P2 | 0.84 |
| P3 | 1 |
| P4 | 1.39 |

TABLE 5

| Taking-in efficiency (Normalized) | |
| --- | --- |
| P1 | 0.50 |
| P2 | 0.71 |
| P3 | 1 |
| P4 | 0.89 |

Application Intensity Distribution of Near-Infrared Light

As appreciated from FIG. 1, the detection light plane 110A may be provided from a dot-shaped region at a lower part of the projector body. For this reason, an in-plane intensity distribution of the near-infrared light covering the projection region S11 may have a great bias. This may largely depend on a distance from the emitting point mainly, although this may also depend on a profile of emitted light. As a result, application intensity corresponding to each of the positions P3 and P4 which is far from the emitting point may be relatively lower than that corresponding to the position P1 which is close to the emitting point. Table 6 describes application intensity (a representative value in the intensity distribution) of each of the positions P1 to P4. Although an application method may have an influence to some extent, it may be difficult to allow the application intensity to be even in the respective positions. When normalized by the position P3 as 1 that is far from the emitting point and have the lowest intensity, the position P1 that is the closest to the emitting point has intensity three times as high as that. Intensity may be also higher in each of the positions P2 and P4 than in the position P3.

TABLE 6

| Application intensity (Normalized) | |
| --- | --- |
| P1 | 3.21 |
| P2 | 2.53 |

TABLE 6-continued

| Application intensity (Normalized) | |
| --- | --- |
| P3 | 1 |
| P4 | 1.80 |

The intensity of light that is guided toward the detection optical system 10B from each of the positions P1 to P4 may be the product of the application intensity distribution of the near-infrared light (Table 6) and the foregoing taking-in efficiency (Table 5). Accordingly, the light intensity may differ between the positions P1 to P4. It is to be noted that, actually, a difference is present between the reflection point and the virtual light emission point (FIG. 9) as described above. This difference may influence the light intensity, which may not allow for simple multiplication.

Further, the difference in light intensity between the detection positions may influence intensity (brightness) of the imaging signal. Signal intensity may therefore differ between the detection positions. Upon the object detection, a signal may be taken out by binarization based on a certain threshold value (a threshold level), for example. However, variations in signal intensity may make it difficult to take out the signal with high accuracy. It may be therefore desired to reduce a difference in light intensity in both qualitative and quantitative manners.

In the present embodiment, the foregoing transmittance adjuster is provided in a predetermined position on an optical path in order to suppress such a difference in light intensity. A case where the blocking plate 21 is used as an example of the transmittance adjuster is described below.

Blocking Plate 21

FIG. 10A illustrates a configuration of a key part of the detection optical system 10B. As illustrated, the detection optical system 10B may include the reduction optical system 14 (the relay lens groups 14A and 14B) between the conjugate plane 50 and the imaging device 13. The blocking plate 21 may be disposed between two relay lenses adjacent to each other in the relay lens groups 14A and 14B included in the reduction optical system 14. A position of the blocking plate 21 on the optical axis is not particularly limited as long as the position of the blocking plate 21 on the optical axis is between the relay lenses. In the present example, the blocking plate 21 may be disposed between the relay lens group 14A which is located on the polarization separation device 15 side and an aperture stop 20.

FIG. 10B illustrates an example of a layout of the blocking plate 21 in a plane perpendicular to the optical axis (an optical axis Z1). The blocking plate 21 may block part of the bundle of passing light rays (a bundle of passing light rays LZ) derived from the near-infrared light. Specifically, the blocking plate 21 may have, for example, a shape, a size, and a position (a position on the optical axis Z1, and a position in the plane perpendicular to the optical axis Z1) that are so set that the blocking plate 21 selectively blocks the bundle of passing light rays from a region that is relatively close to the emitting point of the near-infrared light source 40 (for example, in the position P1 and a region in the vicinity of the position P1) out of the detection positions. For example, the blocking plate 21 may be provided in a position that is biased in the plane perpendicular to the optical axis Z1 so that the blocking plate 21 blocks the maximum amount of bundle of passing light rays from a part equivalent to the position P1 and does not block a bundle of passing light rays from a part equivalent to the position P3. It may be preferable that the provision of the blocking plate 21 cause the intensity distribution, of the bundle of passing light rays LZ, to be even in the plane perpendicular to the optical axis Z1. A planar shape of the blocking plate 21 (a shape of a plane perpendicular to the optical axis Z1) is not particularly limited. For example, the planar shape of the blocking plate 21 may be a rectangular shape as illustrated. However, the planar shape of the blocking plate 21 is not limited thereto, and may be one of an elliptical shape, a semi-circular shape, a trapezoidal shape, and a rectangular shape having rounded corners. This blocking plate 21 may cut off part of the bundle of passing light rays LZ, and thereby adjust a light amount at the image height corresponding to each of the detection positions. It is to be noted that it is preferable to attach and fix the blocking plate 21 onto a chassis in the unit together with the optical members such as other lenses.

The signal processor 17 may detect, for example, a position of a characteristic point of the indicator (an object) 71 such as a human finger and a pointer, for example, in association with coordinates in the projection region S11 on the projection surface 110, on the basis of the imaging signal from the imaging device 13. Examples of the characteristic point may include a shape of a tip of a human finger, a center of gravity of the finger, and center of gravity of a hand. For example, it is possible to extract the coordinate of such a characteristic point by performing binarization, with the predetermined threshold, on the imaging signal D0 obtained from the imaging device 13.

Workings and Effects

Referring to FIG. 11, the projection display unit 1 may project, with the projection lens 16, image information V1 provided on the light valve 12 onto the projection surface 110 to enlarge and display the image information V1 as a projected image V2. The projection surface 110 may be a top of a table, for example. Moreover, the projection display unit 1 may also detect a position of an object on the projection surface 110 by means of the imaging signal D0 obtained from the imaging device 13. Examples of the position of the object may include a position Pt1 of the characteristic point of the indicator (an object) 71 such as a human finger and a pointer.

In the present embodiment, the projection lens 16 may be shared by the projection optical system 10A and the detection optical system 10B, and the imaging device 13 is disposed in the position optically conjugate with the position of the light valve 12. This allows for object detection that has a detection region (a detectable region) that is substantially the same as the projection region S11. Moreover, the foregoing optically-conjugate positional relationship makes it possible to monitor, via the projection lens 16, the position Pt1 of the characteristic point of the indicator 71 on the projection surface 110 to be overlapped with the projected image V2. Moreover, for example, it is possible to perform a pointing operation on the projected image V2 by performing image process on a shape of the indicator 71 by the signal processor 17 to detect the coordinates of the position Pt1 of the characteristic point of the indicator 71. In this case, any coordinate position in the projection region S11 may correspond to a coordinate position in the detection region on a one-to-one basis. Accordingly, a coordinate of the detection position Pt2 for the imaging device 13 may correspond to a coordinate of the position Pt1 of the characteristic point of the indicator 71. In other words, it is possible to detect an object by associating the position in the projection region S11 and the position in the detection region with each other without performing a complicated signal process such as calibration. It is to be noted that the number of the indicator 71 may be two or more. For example, coordinates of tips of fingers of both hands may be detectable. By using the position of the characteristic point of the indicator 71 detected in such a manner, it is possible to perform an intuitive operation as if a touch panel is embedded in the projected image V2 of the projector.

A detailed example of the operation of detecting a position of the characteristic point is described. In the present embodiment, the position detection may be performed using binary data of an optical image, of reflection light from an object (the near-infrared light La1), that is formed on the light reception surface of the imaging device 13. Upon such position detection, a difference may be present in intensity (luminance) of the signal depending on the foregoing difference in detection position, i.e., depending on the distance from the emitting point of the near-infrared light La and the taking-in efficiency, for example.

FIG. 12 schematically illustrates examples of light intensity distributions (g1, g2, and g3) for the respective detection positions. As illustrated, a difference may be present in signal intensity depending on the difference in detection position. The intensity distribution g1 may be an intensity distribution in a part equivalent to the position P1, for example. The intensity distribution g3 may be an intensity distribution in a part equivalent to the position P3, for example. The intensity distribution g2 may be an intensity distribution in a part equivalent to the position P2, for example.

The binarization may involve setting of a predetermined threshold value. The threshold value may be preferably set to a value that allows for extraction of a characteristic point while removing a noise (such as an electric noise and an unnecessary optical component). For example, in a case where a threshold value Th1 (a constant value) illustrated in FIG. 12 is set, a size of the characteristic point may be small in a place having low light intensity (the intensity distribution g3). This may allow for accurate detection of two points (Lp3a and Lp3b) that are close to each other such as two fingers, for example. However, in the case where the threshold value Th1 is used, two points (Lp2a and Lp2b or Lp1a and Lp1b) that are close to each other may be continuous with each other in a place having relatively high light intensity (the intensity distributions g1 and g2). Such two points may be extracted as a single point. This does not contribute to improvement in detection accuracy.

It is to be noted that the foregoing issue may be avoidable to some extent by varying the level of the threshold value. For example, in a state that the signal is not saturated as in the intensity distribution g2, it is possible to accurately detect the two points (Lp2a and Lp2b) that are close to each other by allowing the threshold value to be variable in accordance with the intensity distribution. However, this method involves difficulty in setting of the optimal threshold value in a state where the signal is saturated as in the intensity distribution g1.

To address this, part of the bundle of passing light rays derived from the near-infrared light La1 may be blocked by providing the foregoing blocking plate 21 in the reduction optical system 14 in the present embodiment. Specifically, by blocking the bundle of passing light rays from the position P1 having high light intensity and the vicinity of the position P1, unevenness of intensity is moderated in the light intensity distribution on the light reception surface of the imaging device 13. This may reduce the light amount at the part (corresponding to the position P1) having high light intensity, thereby suppressing saturation of signal. In contrast, the light amount may involve almost no variation at the part (corresponding to the position P3) having low light intensity. Therefore, the signal may not be buried in the noise. As a result, setting of the threshold value based on binarization may be made easier, allowing for extraction of the characteristic point with high accuracy. To give an example, saturation may be avoidable when a signal having high intensity is set to 256 which is the maximum in 256 gradations, and a signal having low intensity is allowed to be suppressed to about 50 which is about one-fifth of the signal having high intensity (when the in-plane luminance ratio is equal to or smaller than 5).

FIG. 13 illustrates, as a comparison example, a light intensity distribution on the light reception surface in a case without the blocking plate 21. As illustrated, unevenness of intensity occurs when the blocking plate 21 is not used. In contrast, the efficiency of reaching the light reception surface of the imaging device 13 may be as illustrated in FIG. 14 in the present embodiment, owing to provision of the blocking plate 21. As a result, the light intensity distribution on the light reception surface may be substantially even as illustrated in FIG. 15.

As described above, according to the present embodiment, the imaging device 13 disposed in a position that is optically conjugate with the position of the light valve 12 receives the light based on the near-infrared light La1 via the projection lens 16 and the polarization separation device 15. The blocking plate 21 that blocks part of the bundle of passing light rays derived from the near-infrared light La1 may be provided between the polarization separation device 15 and the imaging device 13. The blocking plate 21 may be provided in the reduction optical system 14 in this example. This reduces unevenness (non-uniformity) of signal intensity in the light reception surface of the imaging device 13. As a result, it is possible to improve detection accuracy.

Some modifications of the foregoing embodiment are described below. It is to be noted that components similar to those in the foregoing embodiment are denoted with the same numerals and are not further described where appropriate.

Modification 1

FIG. 16 describes an arrangement configuration of the blocking plate 21 according to Modification 1. The blocking plate 21 may be disposed between the relay lens group 14A and the aperture stop 20 in the reduction optical system 14 in the foregoing embodiment. However, the blocking plate 21 may be disposed between the aperture stop 20 and the relay lens group 14B as in the present modification. In other words, the blocking plate 21 may be disposed in any position between two relay lenses in the plurality of relay lenses.

It is possible to achieve effects similar to those of the foregoing embodiment also in the present modification by appropriately setting the shape, the position, and the size of the blocking plate 21 as in the foregoing embodiment.

Modification 2

FIG. 17 illustrates a configuration of a transmittance adjuster (a partially-transmitting mask 21A) according to Modification 2. The partially-transmitting mask 21A may be an optical device having transmittance that varies in a segmented manner in a plane perpendicular to the optical axis Z1 of the bundle of passing light rays. Specifically, the transmittance may be relatively lower in a region D1 corresponding to a bundle of passing light rays from a part including the position P1, and the transmittance may be relatively higher in a region D3 corresponding to a bundle of passing light rays from a part including the position P3. Further, in a region D2 between the regions D1 and D3, the transmittance may be intermediate between the transmittance in the region D1 and the transmittance in the region D3. The partially-transmitting mask 21A may preferably have a transmittance distribution that causes an intensity distribution, in the plane perpendicular to the optical axis Z1 of the bundle of passing light rays, to be even. In this example, segmentation into the three regions D1 to D3 may be performed, and the transmittance may be caused to be different between the regions D1 to D3 from each other. However, the number of segmentation of the region is not limited to three. The number of segmentation of the region may be two, or four or more. For example, the areas and the segmentation pattern of the respective regions are also not limited to those illustrated. Further, the transmittance may vary in a continuous manner.

The foregoing partially-transmitting mask 21A may be disposed, for example, in a position (which is denoted with A1) between the surface 15C of the polarization separation device 15 and the reduction optical system 14 (the relay lens group 14A), in the key configuration illustrated in FIG. 18. Alternatively, the foregoing partially-transmitting mask 21A may be disposed in a position (which is denoted with A2) between the imaging device 13 and the reduction optical system 14 (the relay lens group 14B) in FIG. 18. However, the partially-transmitting mask 21A may be disposed in the reduction optical system 14, i.e., between two relay lenses adjacent to each other in the relay lens groups 14A and 14B.

As in the present modification, the partially-transmitting mask 21A may be used as the transmittance adjuster. It is also possible in this case to reduce unevenness of the signal intensity in the light reception surface of the imaging device 13 as in the foregoing embodiment, by adjusting the transmittance of the bundle of passing light rays for each of the regions. As a result, it is possible to achieve effects similar to those of the foregoing embodiment.

Modification 3

FIG. 19 describes a configuration of a transmittance adjuster (a partially-transmitting film 21B) according to Modification 3. The partially-transmitting film 21B may be adhered onto the surface 15C of the polarization separation device 15. The partially-transmitting film 21B may have transmittance that varies in a segmented manner in a plane perpendicular to the optical axis Z1 of the bundle of passing light rays, as with the foregoing partially-transmitting mask. The partially-transmitting film 21B may have a configuration similar to the configuration of the foregoing partially-transmitting mask 21A except for that the partially-transmitting film 21B may be provided not as a single device but as a film and provided integrally with the polarization separation device 15. Effects equivalent to the effects in the foregoing embodiment may be achievable also by using the foregoing partially-transmitting film 21B.

The disclosure is not limited to the description of the foregoing embodiments, and may be modified in a variety of ways. For example, the foregoing embodiment is described referring to an example case where the light valve 12 and the imaging device 13 have aspect ratios substantially the same as each other. However, the light valve 12 and the imaging device 13 may not necessarily have the same aspect ratio.

Moreover, in the foregoing embodiment, the reflective liquid crystal device is used as the light valve of the disclosure. However, the light valve of the disclosure is not limited to the reflective liquid crystal device and may be another light valve. For example, a digital mirror device (DMD) may be used as the light valve. In this case, the light valve may be of a mirror type that does not utilize polarization characteristics of light. Therefore, a polarization optical system is not used in general. However, an optical system including a polarization separation device such as a polarizing beam splitter in an optical path is allowed to be provided as with the foregoing embodiment to achieve image display using the DMD.

Moreover, the foregoing embodiment is described referring to the ultra-short throw type as one example of the projection display unit of the disclosure. However, the projection display unit of the disclosure is not necessarily limited thereto. In a case where invisible light has an application intensity distribution, the application intensity distribution of the invisible light may cause unevenness of light intensity on a light reception surface. The configuration of the disclosure may be therefore effective in such a case. However, the effects may be especially effective for the ultra-short throw type. It is to be noted that the effects described in the foregoing embodiment, etc. are mere examples. Any other effect may be provided, and any other effect may be further included.

For example, the disclosure may achieve the following configurations.

[1]

A projection display unit including:
- a projection optical system including
  - an illuminator,
  - a projection lens, and
  - a light valve that modulates illumination light supplied from the illuminator on the basis of an image signal, and outputs the modulated illumination light toward the projection lens;
- a polarization separation device disposed between the light valve and the projection lens, the polarization separation device separating entering light into a first polarized component and a second polarized component, and outputting the first polarized component and the second polarized component in respective directions that are different from each other; and
- a detection optical system including an imaging device and a reduction optical system, the imaging device being disposed in a position that is optically conjugate with a position of the light valve, and the reduction optical system being disposed between the imaging device and the polarization separation device, in which
- the imaging device receives, via the projection lens and the polarization separation device, light based on detection invisible light, and
- a transmittance adjuster is disposed between the polarization separation device and the imaging device, the transmittance adjuster adjusting transmittance of at least part of a bundle of passing light rays derived from the invisible light.

[2]

The projection display unit according to [1], in which
the detection optical system includes a plurality of relay lenses serving as the reduction optical system,
the transmittance adjuster is a blocking plate that blocks part of the bundle of passing light rays derived from the invisible light, and
the blocking plate is disposed between any two relay lenses that are adjacent to each other in the plurality of relay lenses in the reduction optical system.

[3]

The projection display unit according to [1] or [2], in which
the transmittance adjuster is a partially-transmitting mask that has transmittance, of the invisible light, that varies in a segmented manner or in a continuous manner in a plane perpendicular to an optical axis, and
the partially-transmitting mask is disposed between the polarization separation device and the reduction optical system.

[4]

The projection display unit according to [1] or [2], in which
the transmittance adjuster is a partially-transmitting mask that has transmittance, of the invisible light, that varies in a segmented manner or in a continuous manner in a plane perpendicular to an optical axis, and
the partially-transmitting mask is disposed between the imaging device and the reduction optical system.

[5]

The projection display unit according to [1] or [2], in which
the detection optical system includes a plurality of relay lenses serving as the reduction optical system,
the transmittance adjuster is a partially-transmitting mask that has transmittance, of the invisible light, that varies in a segmented manner or in a continuous manner in a plane perpendicular to an optical axis, and
the partially-transmitting mask is disposed between any two relay lenses that are adjacent to each other in the plurality of relay lenses in the detection optical system.

[6]

The projection display unit according to [1] or [2], in which the transmittance adjuster is a partially-transmitting film, the partially-transmitting film being adhered onto an optical surface, of the polarization separation device, that outputs light toward the detection optical system, and having transmittance, of the invisible light, that varies in a segmented manner or in a continuous manner in a plane perpendicular to an optical axis.

[7]

The projection display unit according to any one of [1] to [6], in which an in-plane luminance ratio of an imaging signal obtained from the imaging device is equal to or smaller than 5.

[8]

The projection display unit according to any one of [1] to [7], further including a laser light source that applies the invisible light in a radial manner in an in-plane direction in vicinity of the projection surface.

[9]

The projection display unit according to any one of [1] to [8], in which the invisible light is near-infrared light.

[10]

The projection display unit according to any one of [1] to [9], in which the transmittance adjuster has a transmittance distribution that causes intensity distribution, of the bundle of passing light rays derived from the invisible light, to be even in a plane perpendicular to an optical axis.

[11]

The projection display unit according to any one of [1] to [10], further including a signal processor that detects a position of an object on the projection surface on the basis of an imaging signal obtained from the imaging device.

[12]
The projection display unit according to any one of [1] to [11], in which the polarization separation device is a polarizing beam splitter.

[13]
The projection display unit according to any one of [1] to [12], in which the light valve is a reflective liquid crystal display device.

[14]
The projection display unit according to [13], in which the polarization separation device has a first surface, a second surface, a third surface, and a fourth surface that each serve as a light entering surface or a light output surface, and
the polarization separation device outputs, from the second surface, the first polarized component out of light that has entered the polarization separation device from the first surface, outputs, from the third surface, the second polarized component out of the light that has entered the polarization separation device from the first surface, outputs, from the fourth surface, the second polarized component out of light that has entered the polarization separation device from the second surface, and outputs, from the third surface, the first polarized component out of light that has entered the polarization separation device from the fourth surface.

[15]
The projection display unit according to [14], in which the projection optical system causes
the illuminator to output the illumination light toward the first surface of the polarization separation device,
the light valve to modulate the first polarized component, out of the illumination light, that has been outputted from the second surface of the polarization separation device, and output light resulting from the modulation toward the second surface of the polarization separation device, and
the projection lens to project, toward the projection surface, light, out of the light resulting from the modulation, that has been outputted from the fourth surface of the polarization separation device.

[16]
The projection display unit according to [15], in which the detection optical system causes
the reduction optical system to receive object detection light via the projection lens, the fourth surface of the polarization separation device, and the third surface of the polarization separation device, and
the imaging device to receive light outputted from the reduction optical system.

It should be understood by those skilled in the art that various modifications, combinations, sub-combinations, and alterations may occur depending on design requirements and other factors insofar as they are within the scope of the appended claims or the equivalents thereof.

The invention claimed is:
1. A projection display apparatus, comprising:
a projection optical section that includes:
an illuminator configured to supply illumination light;
a projection lens; and
a light valve configured to:
modulate the illumination light supplied from the illuminator; and
output the modulated illumination light toward the projection lens;
a polarization separation device between the light valve and the projection lens;
a detection optical section that includes:
an imaging device; and
a reduction optical section, wherein the reduction optical section is between the imaging device and the polarization separation device; and
a transmittance adjuster between the polarization separation device and the imaging device, wherein
the imaging device is configured to receive light via the projection lens and the polarization separation device, wherein the light is obtained based on an invisible light.

2. The projection display apparatus according to claim 1, wherein the transmittance adjuster is configured to adjust transmittance of at least part of a bundle of passing light rays derived from the invisible light.

3. The projection display apparatus according to claim 1, wherein the light valve is further configured to
modulate the illumination light supplied from the illuminator based on an image signal.

4. The projection display apparatus according to claim 1, wherein the polarization separation device is configured to:
separate entering light into a first polarized component and a second polarized component; and
output the first polarized component and the second polarized component in respective directions that are different from each other.

5. The projection display apparatus according to claim 1, wherein
a position of the imaging device is optically conjugate with a position of the light valve.

6. The projection display apparatus according to claim 1, wherein
the detection optical section further includes a plurality of relay lenses that serves as the reduction optical section,
the transmittance adjuster is a blocking plate that blocks part of a bundle of passing light rays derived from the invisible light, and
the blocking plate is between any two relay lenses that are adjacent to each other in the plurality of relay lenses in the reduction optical section.

7. The projection display apparatus according to claim 1, wherein
the transmittance adjuster is a partially-transmitting mask that has transmittance of the invisible light,
the transmittance varies in one of a segmented manner or in a continuous manner in a plane perpendicular to an optical axis, and
the partially-transmitting mask is between the polarization separation device and the reduction optical section.

8. The projection display apparatus according to claim 1, wherein
the transmittance adjuster is a partially-transmitting mask that has transmittance of the invisible light,
the transmittance varies in one of a segmented manner or in a continuous manner in a plane perpendicular to an optical axis, and
the partially-transmitting mask is between the imaging device and the reduction optical section.

9. The projection display apparatus according to claim 1, wherein
the detection optical section further includes a plurality of relay lenses that serves as the reduction optical section,
the transmittance adjuster is a partially-transmitting mask that has transmittance of the invisible light, the transmittance varies in one of a segmented manner or in a continuous manner in a plane perpendicular to an optical axis, and the partially-transmitting mask is between any two relay lenses that are adjacent to each other in the plurality of relay lenses in the detection optical section.

10. The projection display apparatus according to claim 1, wherein the transmittance adjuster is a partially-transmitting film adhered onto an optical surface of the polarization separation device, the optical surface is configured to output light toward the detection optical section and has transmittance of the invisible light, and the transmittance varies in one of a segmented manner or in a continuous manner in a plane perpendicular to an optical axis.

11. The projection display apparatus according to claim 1, further comprising a laser light source configured to apply the invisible light in a radial manner in an in-plane direction to cover a projection surface.

12. The projection display apparatus according to claim 1, wherein the invisible light is near-infrared light.

13. The projection display apparatus according to claim 1, wherein the transmittance adjuster has a transmittance distribution that causes intensity distribution of a bundle of passing light rays derived from the invisible light to be even in a plane perpendicular to an optical axis.

14. The projection display apparatus according to claim 1, further comprising a signal processor configured to detect a position of an object on a projection surface based on an imaging signal obtained from the imaging device.

15. The projection display apparatus according to claim 1, wherein the polarization separation device is a polarizing beam splitter.

16. The projection display apparatus according to claim 1, wherein the light valve is a reflective liquid crystal display device.

17. The projection display apparatus according to claim 16, wherein the polarization separation device has a first surface, a second surface, a third surface, and a fourth surface, each of the first surface, the second surface, the third surface, and the fourth surface serves as one of a light entering surface or a light output surface, and the polarization separation device is further configured to:
output, from the second surface, a first polarized component out of first light that enter the polarization separation device from the first surface;
output, from the third surface, a second polarized component out of the first light that enter the polarization separation device from the first surface;
output, from the fourth surface, the second polarized component out of second light that enter the polarization separation device from the second surface; and
output, from the third surface, the first polarized component out of third light that enter the polarization separation device from the fourth surface.

18. The projection display apparatus according to claim 17, wherein the projection optical section is configured to:
control the illuminator to output the illumination light toward the first surface of the polarization separation device;
control the light valve to:
modulate the first polarized component out of the illumination light that is outputted from the second surface of the polarization separation device; and
output fourth light that resulted from the modulation of the first polarized component toward the second surface of the polarization separation device; and
control the projection lens to project, toward a projection surface, fifth light out of the fourth light that resulted from the modulation of the first polarized component,
wherein the fifth light out of the fourth light that resulted from the modulation of the first polarized component is outputted from the fourth surface of the polarization separation device.

* * * * *